(12) United States Patent
Wada et al.

(10) Patent No.: US 7,049,578 B2
(45) Date of Patent: May 23, 2006

(54) OPTICAL MOVEMENT INFORMATION DETECTOR, MOVEMENT INFORMATION DETECTION SYSTEM, ELECTRONIC EQUIPMENT AND ENCODER

(75) Inventors: Hideo Wada, Katsuragi (JP); Nobuhisa Watanabe, Katsuragi (JP); Takayuki Taminaga, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/052,476

(22) Filed: Feb. 8, 2005

(65) Prior Publication Data

US 2005/0179908 A1     Aug. 18, 2005

(30) Foreign Application Priority Data

Feb. 12, 2004   (JP) ............................ P2004-034927

(51) Int. Cl.
 *G01P 3/40*   (2006.01)
 *G01J 1/42*   (2006.01)
 *G01B 11/02*  (2006.01)
(52) U.S. Cl. .............................. 250/231.13; 356/28.5; 356/496; 356/218
(58) Field of Classification Search ................ 356/28, 356/28.5, 496, 498, 499, 218, 221, 222, 226, 356/227; 250/237 G
See application file for complete search history.

(56) References Cited

U.S. PATENT DOCUMENTS

| 5,187,538 A * | 2/1993 | Iwamoto et al. ........... 356/28.5 |
| 2005/0046824 A1* | 3/2005 | Wada et al. ................ 356/28.5 |

FOREIGN PATENT DOCUMENTS

| JP | 3-235060 | 10/1991 |
| JP | 5-323030 | 12/1993 |

OTHER PUBLICATIONS

Yeh et al., "Localized Fluid Flow Measurements with an He-Ne Laser Spectrometer", Applied Physics Letters, vol. 4, No. 10, May 15, 1964, pp. 176-178.

* cited by examiner

*Primary Examiner*—Stephone B. Allen
*Assistant Examiner*—Suezu Ellis
(74) *Attorney, Agent, or Firm*—Nixon & Vanderhye, P.C.

(57) ABSTRACT

Two different phase components obtained by splitting interference light of light from an object by a diffraction grating are guided to first and second PD's by a second optical system. A first signal is outputted from a first signal processing circuit section that receives light reception signal from first PD, and a second signal is outputted from a second signal processing circuit section that receives a light reception signal from the second PD. A third signal of an interference light signal whose noise component is removed is outputted by a third signal processing circuit section using the first signal and the second signal. Then, the frequency of the third signal is detected, and the movement velocity of the object is detected by a movement velocity detection section on the basis of the frequency.

21 Claims, 16 Drawing Sheets

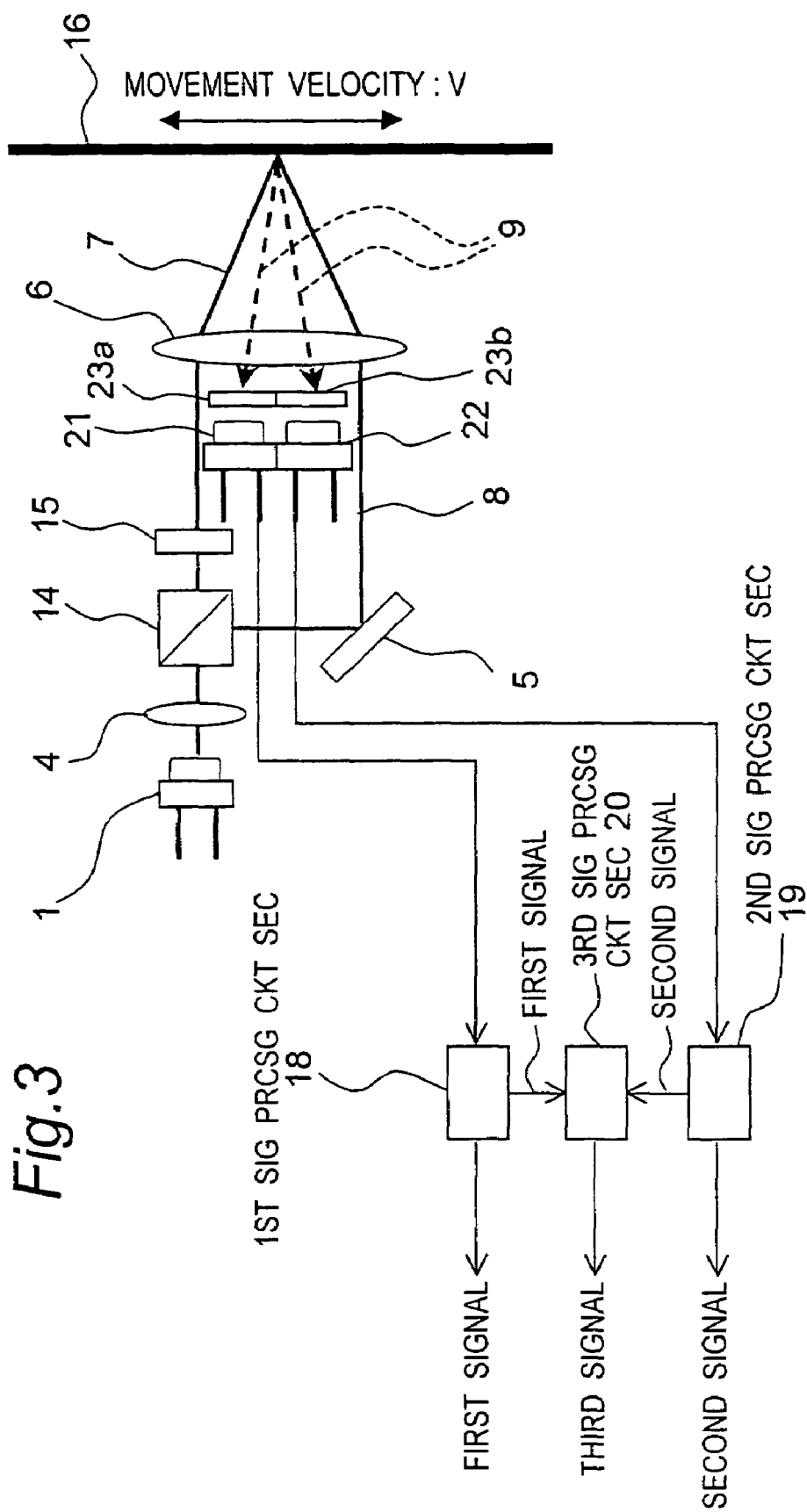

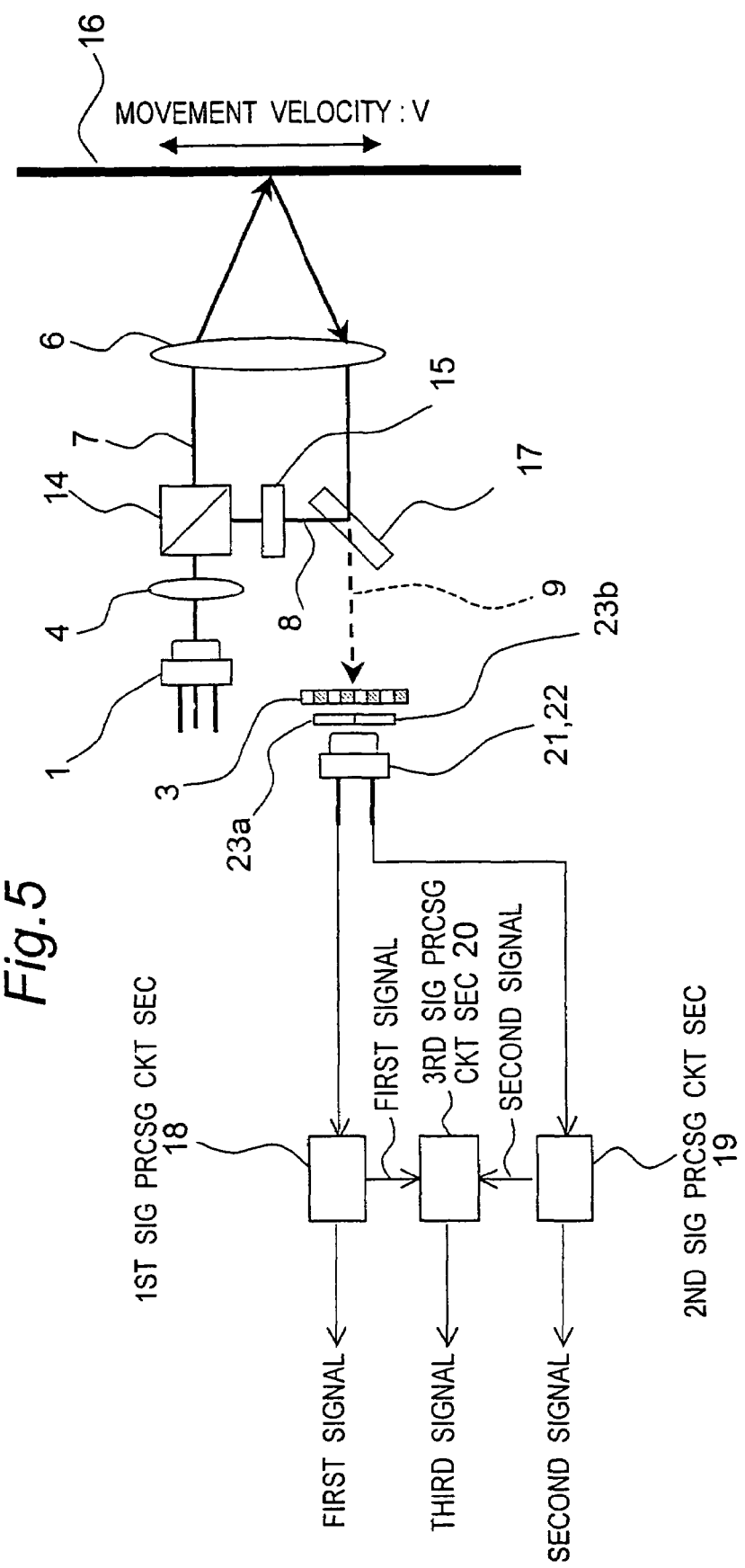

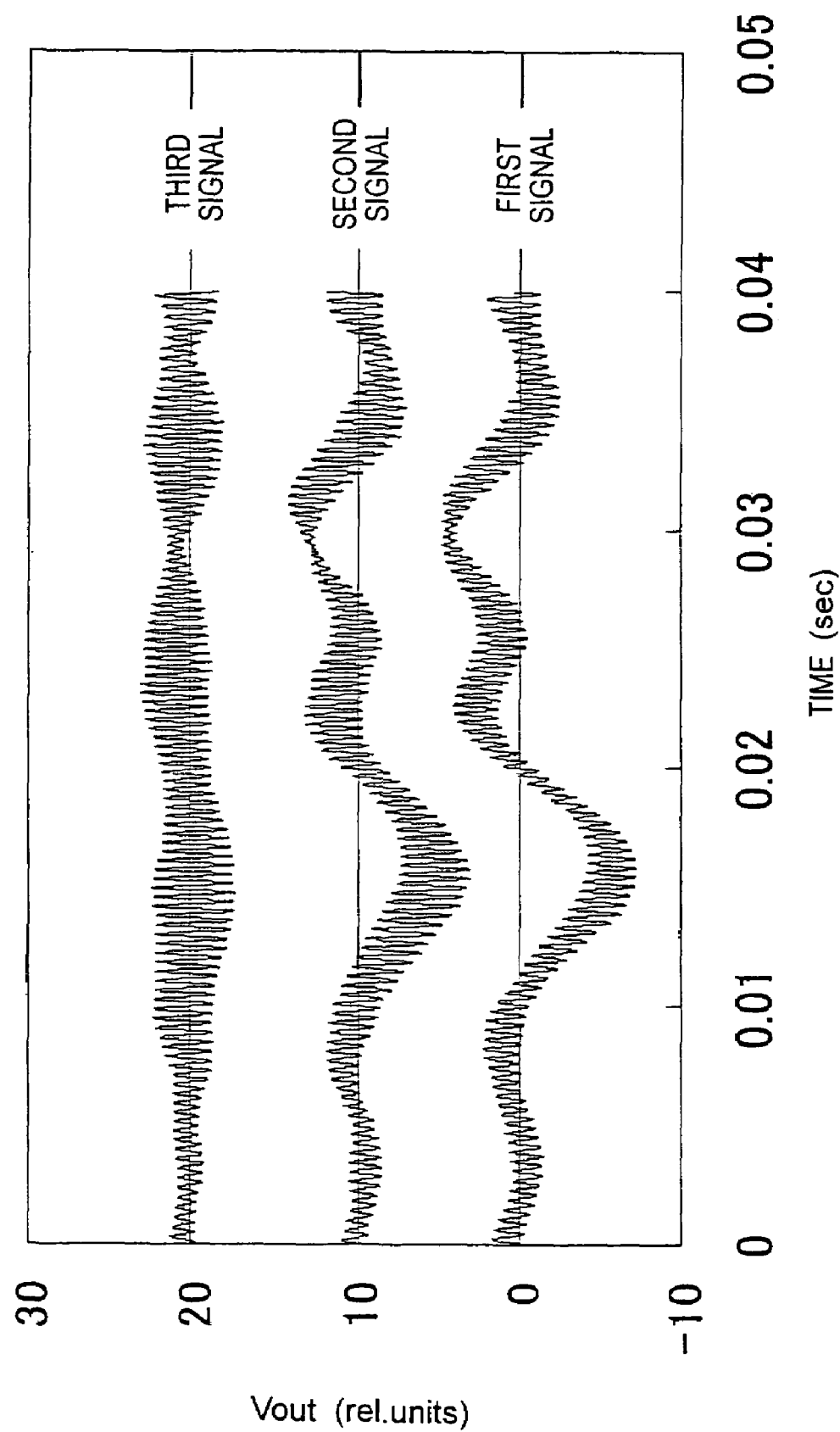

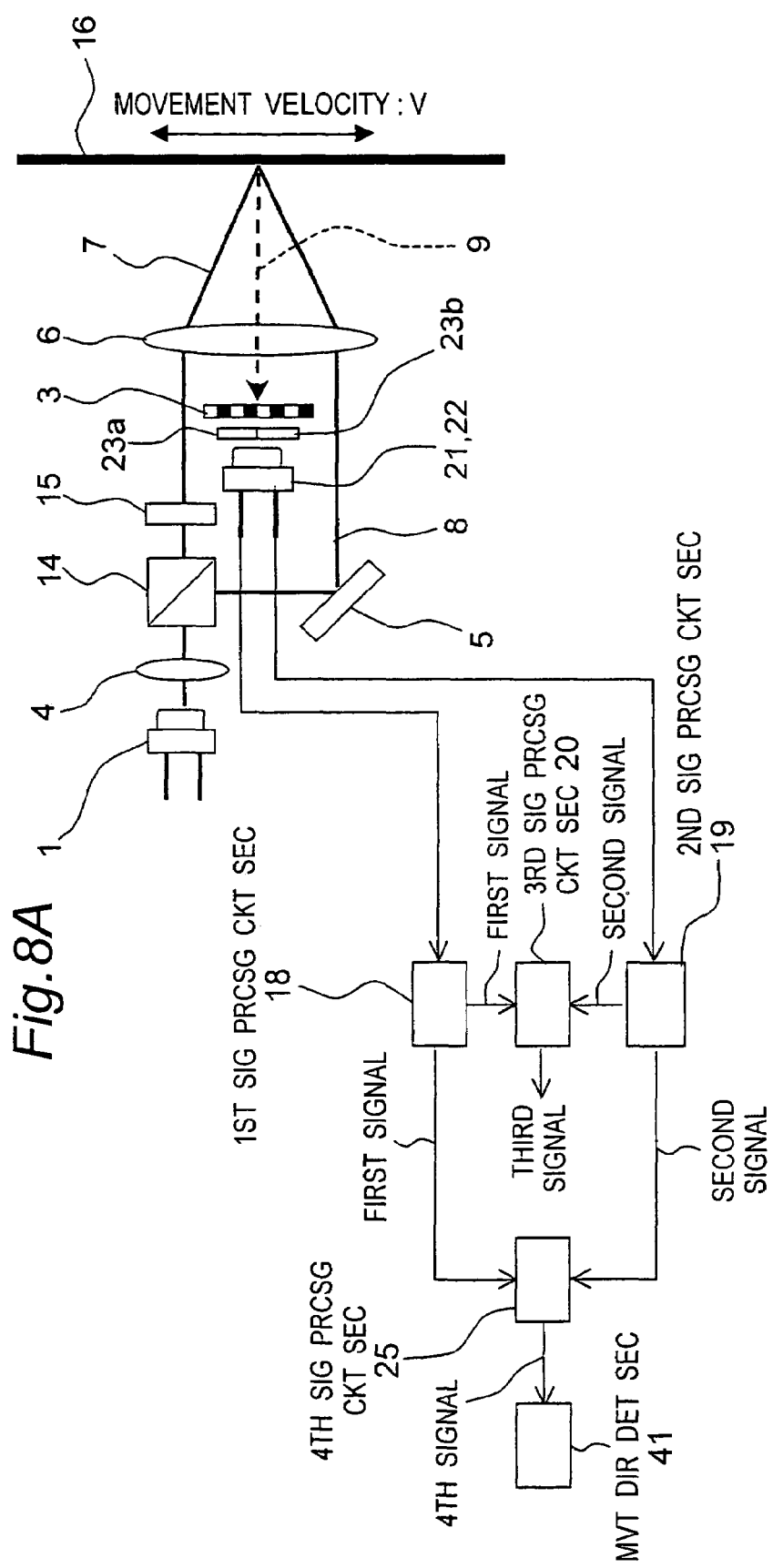

OPTICAL MOVEMENT INFORMATION DETECTOR, MOVEMENT INFORMATION DETECTION SYSTEM, ELECTRONIC EQUIPMENT AND ENCODER

This Nonprofessional application claims priority under 35 U.S.C. §119(a) on Patent Application No. 2004-034927 filed in Japan on Feb. 12, 2004, the entire contents of which are hereby incorporated by reference.

BACKGROUND OF THE INVENTION

The present invention relates to optical movement information detectors, movement information detection systems, electronic equipment and encoders. More specifically the present invention relates to an optical movement information detector that is used as a Doppler velocimeter for detecting the velocity of an object to be measured by applying laser light to the moving object to be measured and receiving scattered light from the object to be measured including the frequency shift of light corresponding to the movement velocity of the object to be measured as well as a movement information detection system, electronic equipment and an encoder employing the detector. The present invention relates, in particular, to a signal processing technology for detecting a velocity with high accuracy and a signal processing technology for expanding the detectable velocity range, also to a signal processing technology usable for a small-sized Doppler velocimeter and further to electronic equipment with the built-in optical movement information detector that can also be used as a displacement information detector for calculating displacement information on the basis of the velocity information of the object to be measured and time information.

In general, when a light source and an observer are moving relative to each other, light suffers a change in frequency due to the Doppler effect. A laser Doppler velocimeter (hereinafter referred to as LDV) utilizes this Doppler effect and applies laser light to a moving object to be measured to measure the Doppler frequency shift of scattered light and detects the movement velocity of the object to be measured. This LDV has been made public by Yeh and Cummins in 1964 (Appl. Phys. Lett. 4–10(1964)176) and is currently generally well known and put to practical use.

FIG. 11 shows an optical system diagram of a conventional typical differential LDV (refer to, for example, JP 03-235060 A). FIG. 11 shows a semiconductor laser (hereinafter, referred to as LD (Laser Diode)) 101, a photodetector (hereinafter, referred to as PD (Photo Diode)) 102, a diffraction grating 103, a collimator lens (hereinafter, CL) 104, mirrors 105, a condenser lens (hereinafter, referred to as OL) 106, a first light flux 107 and a second light flux 108 of positive and negative first-order lights diffracted by the diffraction grating 103. In this optical system, the laser light emitted from the LD 101 is converted into a parallel light flux by the CL 104 and split into the positive and negative first-order diffracted lights at a diffraction angle θ by the diffraction grating 103 to become the first light flux 107 and the second light flux 108. The light fluxes are reflected on the mirrors 105 and thereafter superposed on the object to be measured at an incident angle θ. The light fluxes scattered by the object 114 to be measured undergo a Doppler frequency shift (±$f_d$) and are different from the oscillation frequency ($f_0$) of the LD 101, and therefore, beat between the interference waves is generated. This is called a beat signal. By subjecting the beat frequency of the beat signal to heterodyne detection by the photodetector 102, the movement velocity of the object to be measured can be obtained. A detailed description is provided below.

Assuming now that the rightward direction is the forward direction as shown in FIG. 11, then the first light flux 107 and the second light flux 108 undergo Doppler frequency shifts of $-f_d$ and $+f_d$, respectively, so that the apparent frequency of the first light flux 107 becomes ($f_0-f_d$) and the apparent frequency of the second light flux 108 becomes ($f_0+f_d$). It is to be noted that $f_0$ is the oscillation frequency of the LD 101. At this time, an electric field of the laser light emitted from the LD 101 can be expressed by:

$$E_0 \cdot \cos(2\pi f_0 t)$$

and therefore, the first light flux 107 and the second light flux 108 can be expressed by:

First Light Flux: $I_A = E_A \cdot \cos\{2\pi(f_0-f_d)t + \phi_A\}$     Equation (1):

Second Light Flux: $I_B = E_B \cdot \cos\{2\pi(f_0+f_d)t + \phi_B\}$     Equation (2):

It is to be noted that $E_0$, $E_A$ and $E_B$ represent the amplitudes of the respective lights, $\phi_A$ and $\phi_B$ represent the phases of the respective lights. The frequency of light is generally 100 THz ($10^{14}$ Hz), and therefore, the frequency information of Equation (1) and Equation (2) cannot directly be measured. Accordingly, the heterodyne detection is generally used as described above, and the expression $f_0 \gg f_d$ holds. Therefore, the interference wave of Equation (1) and Equation (2) can be expressed by:

Equation (3):

$$\langle |I_A + I_B|^2 \rangle = \frac{E_A^2 + E_B^2}{2} + E_A \cdot E_B \cdot \cos\{2\pi(2f_d)t - (\phi_A - \phi_B)\}$$

It is to be noted that the symbol "<>" on the left side of Equation (3) represents a time average. Therefore, the frequency of the interference wave can be measured by the PD 102.

FIG. 12 shows a view when two light fluxes are made incident at arbitrary angles (α, β) and scattered light is received at an arbitrary angle (γ) when the object 114 to be measured is moving at a velocity V. The amount of frequency shift due to the Doppler effect is obtained strictly by using the Lorentz transformation according to the theory of relativity. When the movement velocity V of the object 114 to be measured is sufficiently smaller than the light velocity c, the frequency shift can be obtained through approximation as follows. Relative velocities $V_{A1}$ and $V_{B1}$ of the moving object from a light source A and a light source B can be expressed by $$V_{A1} = c - V \sin\alpha$$

$$V_{B1} = c + V \sin\beta \quad\quad\quad \text{Equations (4):}$$

Apparent frequencies $f_{A1}$ and $f_{B1}$ of the lights viewed from the moving object (object 114 to be measured) are expressed by Equations (5):

$$f_{A1} = \frac{V_{A1}}{\lambda} = \frac{1}{\lambda} \cdot (c - V\sin\alpha)$$

$$f_{B1} = \frac{V_{B1}}{\lambda} = \frac{1}{\lambda} \cdot (c + V\sin\beta)$$

Relative velocities $V_{A2}$ and $V_{B2}$ of the scattered (reflected) lights with respect to the moving object are expressed by $$V_{A2}=c-V\sin\gamma$$

$$V_{B2}=c-V\sin\gamma \quad \text{Equations (6):}$$

Therefore, the frequencies $f_{A2}$ and $f_{B2}$ of the lights viewed from the observation point can be expressed by Equations (7):

$$f_{A2} = \frac{c}{V_{A2}} \cdot f_{A1} = \frac{c}{\lambda} \cdot \frac{1 - \frac{V}{c} \cdot \sin\alpha}{1 - \frac{V}{c} \cdot \sin\gamma}$$

$$f_{B2} = \frac{c}{V_{B2}} \cdot f_{B1} = \frac{c}{\lambda} \cdot \frac{1 + \frac{V}{c} \cdot \sin\beta}{1 - \frac{V}{c} \cdot \sin\gamma}$$

A difference between the frequency in Equations (7) and the frequency of the incident light becomes the Doppler frequency shift amount: $f_d$. The beat frequency of the two light fluxes measured at the observation point becomes expressed by Equation (8):

$$2f_d = |f_{B2} + f_{A2}| = \frac{V}{\lambda} \cdot (\sin\alpha + \sin\beta)$$

according to c>>V, and it can be understood that this does not depend on the position (angle: $\gamma$) of the observation point. In FIG. 11, $$\alpha=\beta=\theta$$

and therefore, in the general LDV optical system of FIG. 11, according to Equation (8), Equation (9):

$$2f_d = \frac{2V}{\lambda} \cdot \sin\theta$$

holds. Therefore, by measuring the frequency $2f_d$ expressed by Equation (3) and carrying out calculation using Equation (9), the movement velocity V of the object can be obtained.

Moreover, Equation (9) can be geometrically considered as follows. FIG. 13 is an enlarged view of the region where two light fluxes of FIG. 11 overlap each other again. The two light fluxes are made incident at the incident angle $\theta$ and cross each other, and the dashed lines in the figure indicate part of equal wave fronts of the light fluxes. An interval between the dashed lines becomes the light wavelength $\lambda$. Moreover, the vertical thick lines indicate the bright portions of the interference fringes, and assuming that an interval of the bright portions is $\Delta$, then $\Delta$ is expressed by Equation (10):

$$\Delta = \frac{\lambda}{2\sin\theta}$$

As shown in FIG. 13, when the object (indicated by the black dot •) perpendicularly passes through the interference fringes at the velocity V, a frequency f thereof becomes expressed by Equation (11):

$$f = \frac{V}{\Delta} = \frac{2V}{\lambda} \cdot \sin\theta = 2f_d$$

which becomes equal to Equation (9). This way of thinking is called the interference fringe model.

In the LDV described above, a signal obtained through photoelectric conversion by the photodetector is the sum of the DC (Direct Current) component and the AC (Alternating Current) component as expressed by Equation (3). In this case, as expressed by Equation (9) and Equation (11), the LDV takes advantage of the fact that the frequency of the signal has a relation proportional to the movement velocity of the object to be measured, and the parameter to be detected is the frequency. Although the ideal LDV signal oscillates with an amplitude=$E_A E_B$ around a constant DC level=$(E_A^2+E_B^2)/2$ as expressed by Equation (3), actually the DC signal level is disadvantageously excessively larger than the amplitude of the AC signal due to the coherence of the light source used, the beam spot overlap deviation, variations in the quantity of light of both the light fluxes, the incident angle dependence of the surface reflectance of the object to be measured and so on. If the measurement is carried out directly by the photodetector, the AC signal is disadvantageously buried in the large DC noises and becomes a signal of a very degraded signal-to-noise ratio. Therefore, the movement velocity of the object to be measured cannot correctly be measured.

With regard to the problems described above, it is generally possible to extract only the AC component by removing the DC component from a signal received by a photodiode 102 and subjected to photoelectric conversion by various BPF's (Bandpass Filters) or the like and by amplifying the signal component in an amplifier circuit so as to obtain a signal of a high signal-to-noise ratio, as shown in FIG. 14. In FIG. 14, the reference numeral 110 denotes an HPF (Highpass Filter), 112 and 113 denote LPF's (Lowpass Filters), and 111 denotes resistors and capacitors for determining the time constants of the LPF's 112 and 113.

However, the AC components of the signal measured by the Doppler velocimeter include not only the Doppler frequency shift of the object to be measured but also high-frequency and low-frequency noises, and this leads to a problem that the AC noises disadvantageously pass through the BPF, making the velocity detection difficult. Among these, a particularly serious problem is the low-frequency noises. In general, the objects of which the velocity is to be detected by an LDV include various objects of powders, fluids, solid surfaces and so on. Since the objects are moving, the reflected light intensity is changed by the variation in the surface reflectance on a solid surface and by the magnitude of the density of the included particles in the cases of powders and fluids. Therefore, a noise having a frequency attributed to the change is generated. As described above, the LDV signal includes the low-frequency noise component ascribed to the variation in the reflected light intensity. The BPF is able to detect the velocity by setting the low-frequency noise component out of the band and setting the Doppler signal inside the band. However, since the frequency of the low-frequency noise component is increased and decreased in accordance with the magnitude of the movement velocity of the object to be measured with the Doppler frequency of the object to be measured. Therefore, the frequency of the low-frequency noise component is increased when the movement velocity is increased and disadvantageously enters the passband of BPF, producing a signal of a low signal-to-noise ratio. Moreover, the problem can be avoided by setting the BPF passband in a sufficiently high frequency region with respect to the movement velocity range of the object to be measured so that the low-frequency noises do not enter the passband. However, the detectable velocity range becomes very narrow, and this significantly limits the practical use range of the LDV.

The present invention has been accomplished in view of the problems and has an object to provide an optical movement information detector capable of detecting the movement velocity of the object to be measured with high accuracy in a wide range of velocity band as well as a movement information detection system, electronic equipment and an encoder employing the detector.

Another object of the present invention is to provide an optical movement information detector capable of calculating displacement information by using detected movement velocity and time information as well as a movement information detection system, electronic equipment and an encoder employing the detector.

SUMMARY OF THE INVENTION

In order to achieve the above objects, the present invention provides an optical movement information detector comprising:

a semiconductor light-emitting device which emits coherent light;

an optical branching device which splits the coherent light emitted from the semiconductor light-emitting device into a first light flux and a second light flux;

a first optical system which applies at least one of the first and second light fluxes split by the optical branching device to a moving object to be measured;

a phase changing section which is arranged on an optical axis of either one of the first and second light fluxes of the first optical system and changes a phase of light;

a second optical system which guides to a first photodetector and a second photodetector, interference light caused by scattered light from the object to be measured when both the first and second light fluxes are applied to the object to be measured or interference light caused by interference of one of the first and second light fluxes with scattered light from the object to be measured when the other of the first and second light fluxes is applied to the object to be measured;

an interference light splitting section for splitting the interference light caused by the scattered light from the object to be measured of the second optical system into two different phase components having two different phases defined by the phase changing section and making the first and second photodetectors receive the split two different phase components;

a first signal processing circuit section which receives a light reception signal from the first photodetector and outputs a first signal that represents one phase component of the interference light;

a second signal processing circuit section which receives a light reception signal from the second photodetector and outputs a second signal that represents the other phase component of the interference light;

a third signal processing circuit section which outputs a third signal of an interference light signal whose noise component is removed by using the first signal from the first signal processing circuit section and the second signal from the second signal processing circuit section; and a movement velocity detection section which detects a frequency of the third signal from the third signal processing circuit section and detects a movement velocity of the object to be measured on the basis of the frequency.

According to the optical movement information detector of the above construction, the low-frequency noises included in the first signal and the second signal are almost in phase, and the frequency of the interference light signal to be detected is intentionally provided with a phase difference by the phase changing section. Therefore, although the low-frequency noises are canceled by taking a difference between the first signal and the second signal, the interference light signal necessary for detecting the movement velocity of the object to be measured remains. As described above, by splitting the interference light caused by the scattered light from the object to be measured, to which the two light fluxes (one has a phase delay) are applied, into two components of different phases and obtaining the interference light signal, from which the low-frequency noises are effectively removed by using the split two interference light signals, the movement velocity of the object to be measured can be detected with high accuracy within a wide velocity range on the basis of the interference light signal.

In one embodiment, the third signal processing circuit section comprises:

a differential operation section which carries out differential operation of the first signal and the second signal and outputs a result of the operation as a third signal.

According to the embodiment, the differential operation section of the third signal processing circuit section carries out the differential operation of the first signal and the second signal and outputs the operation result as the third signal. Therefore, the low-frequency noises can effectively be removed.

In one embodiment, the first photodetector and the second photodetector receive the interference light caused by the scattered light from an identical detection point of the object to be measured.

The movement velocity of the object to be measured can be obtained from the diffused light reflected on the point (beam spot) at which the first light flux and the second light flux overlap each other on the object to be measured. When the object to be measured is expanded or contracted or when individual particles move independently, the movement velocity is varied depending on the place. The third signal is given by the difference between the first signal and the second signal, and varied velocities are to be detected when the object whose velocity is varied depending on the place as described above or when the first photodetector and the second photodetector are in focus at varied points in the beam spots depending on the lenses. In this case, since the first signal and the second signal have different frequencies, the low-frequency noises cannot effectively be removed, and the frequency at the velocity desired to be measured cannot be detected. Then, according to the embodiment, the first photodetector and the second photodetector receive the interference light caused by the scattered light from an identical detection point of the object to be measured, and therefore, an interference light signal from which the low-frequency noises are effectively removed can be obtained.

In one embodiment, the third signal processing circuit section comprises:

a standardization operation section which standardizes the first signal from the first signal processing circuit section and the second signal from the second signal processing circuit section so that signal levels of the first and second signals match with each other, wherein the differential operation section carries out differential operation of the first signal and the second signal standardized by the standardization operation section.

According to the embodiment, when the differential operation of the first signal and the second signal is carried out, the signal intensities of the first signal and the second signal are by equalized through the standardization of the first signal and the second signal by the standardization operation section. Therefore, the low-frequency noise component can effectively be removed.

In one embodiment, the standardization operation section standardizes the first signal and the second signal on the basis of at least one of a maximum value on a positive side or a maximum value in terms of an absolute value on a negative side of the amplitudes of the first signal from the first signal processing circuit section and the second signal from the second signal processing circuit section.

According to the embodiment, the signal has both positive and negative values since the signal is represented by the trigonometric function. At least one of the maximum value on the positive side and the maximum value in terms of an absolute value on the negative side of the amplitudes of the first signal and the second signal is detected by a peak hold circuit or the like for either one of the values, and the first signal and the second signal are standardized by using the maximum value.

In one embodiment, the standardization operation section standardizes the first signal and the second signal on the basis of a peak-to-peak value of the amplitudes of the first signal from the first signal processing circuit section and the second signal from the second signal processing circuit section.

According to the embodiment, by detecting both the positive and negative peaks of the first signal and the second signal and standardizing the signal by using the peak-to-peak value (amplitude maximum value), the low-frequency noises can be removed more effectively.

One embodiment comprises:

a fourth signal processing circuit section which detects a phase of the first signal and a phase of the second signal and detects a phase difference between the first signal and the second signal.

According to the embodiment, by detecting the phase difference between the first signal and the second signal by the fourth signal processing circuit section, the movement direction of the object to be measured can be detected.

One embodiment comprises:

a movement direction detection section which detects a movement direction of the object to be measured on the basis of the phase difference detected by the fourth signal processing circuit section.

According to the embodiment, the movement direction of the object to be measured can be determined by the positiveness or negativeness of the phase difference detected by the fourth signal processing circuit section.

In one embodiment, the movement velocity detection section includes a frequency counter.

According to the embodiment, by detecting, for example, the time interval in which the signal intensity becomes not smaller than a certain threshold value by using a frequency counter, the movement velocity can be obtained. Furthermore, the phase difference can be detected in accordance with the timing at which the first signal and the second signal become not smaller than the threshold value, and therefore, the movement direction of the object to be measured can also be detected.

In one embodiment, the movement velocity detection section carries out Fast Fourier Transform.

According to the embodiment, by taking in the signal for a specified time and subjecting the signal to Fast Fourier Transform (FFT), the frequency can be obtained. Furthermore, the phase of the signal can be obtained from the ratio of the real part to the imaginary part obtained through the calculation process of FFT, and the movement direction of the object to be measured can be detected.

In one embodiment, an identical lens is used for the first optical system and the second optical system.

According to the embodiment, by using an identical lens for the first optical system and the second optical system, light reception from the identical spot of the first photodetector and the second photodetector can easily be achieved.

In one embodiment, the first and second photodetectors are photodiodes formed on an identical semiconductor substrate.

According to the embodiment, by forming the photodiodes of the first and second photodetectors on the identical semiconductor substrate, the parts count can be reduced.

In one embodiment, the first and second photodetectors are segmented photodiodes formed on an identical semiconductor substrate.

According to the embodiment, by providing the first and second photodetectors by the segmented photodiodes formed on the identical semiconductor substrate, the chip area can be reduced, and the downsizing and cost reduction can be achieved.

In one embodiment, the third signal processing circuit section comprises:

an attenuator circuit for adjusting a level of the first signal from the first signal processing circuit section;

a first peak hold circuit which holds a maximum value of amplitude of the first signal whose level is adjusted by an attenuator circuit;

a second peak hold circuit which holds a maximum value of amplitude of the second signal from the second signal processing circuit section;

a first differential operation section which carries out differential operation of a signal from the first peak hold circuit that represents the maximum value of the amplitude of the first signal and a signal from the second peak hold circuit that represents the maximum value of the amplitude of the second signal and inputs a signal that represents the difference to the attenuator circuit; and a second differential operation section which carries out differential operation of the first signal whose level is adjusted by the attenuator circuit and the second signal from the second signal processing circuit section and outputs a result of the differential operation as the third signal, wherein the level of the first signal from the first signal processing circuit section is adjusted on the basis of the signal representing the difference from the first differential operation section by the attenuator circuit so that a difference between a signal that represents the maximum value of the amplitude of the first signal from the first peak hold circuit and a signal that represents the maximum value of the amplitude of the second signal from the second peak hold circuit disappears.

Also, in one embodiment, the third signal processing circuit section comprises:

a first resistor for setting a level of the first signal inputted to the attenuator circuit; and a second resistor for setting a level of the second signal inputted to the second peak hold circuit, wherein resistance values of the second resistor and the first resistor are set so that the level of the first signal inputted to the attenuator circuit becomes greater than the level of the second signal inputted to the second peak hold circuit.

According to the embodiment, by setting the resistance values of the second resistor and the first resistor so that the level of the first signal inputted to the attenuator circuit becomes greater than the level of the second signal inputted to the second peak hold circuit, the signal intensity of the inputted second signal can preparatorily be reduced, and therefore, the standardization can reliably be achieved.

In one embodiment, the first photodetector, the second photodetector, and the first, second and third signal processing circuit sections constitute a photodetector with a built-in signal processing circuit section formed on an identical semiconductor substrate.

According to the embodiment, the first photodetector, the second photodetector and the first, second and third signal processing circuit sections are formed on the identical semiconductor substrate. Therefore, the downsizing and cost reduction of the device construction can be achieved.

In one embodiment, the first signal processing circuit section and the second signal processing circuit section respectively include analog amplifier circuits that output respectively the first signal and the second signal that are analog signals, the detector comprises:

a first analog-to-digital converter circuit which converts the first signal from the first signal processing circuit section from an analog form into a digital form and outputs a first digital signal converted in the digital form;

a second analog-to-digital converter circuit that converts the second signal from the second signal processing circuit section from an analog form into a digital form and outputs a second digital signal converted in the digital form; and a memory which stores the first and second digital signals converted by the first and second analog-to-digital converter circuits, wherein a standardization operation section included in the third signal processing circuit section carries out standardization of the first and second digital signals from the first and second analog-to-digital converter circuits on the basis of the first and second digital signals stored in the memory so that signal levels of the first digital signal from the first analog-to-digital converter circuit and the second digital signal from the second analog-to-digital converter circuit match with each other, and a differential operation section included in the third signal processing circuit section carries out differential operation for obtaining a difference between the first digital signal and the second digital signal standardized by the standardization operation section and outputs a result of the operation as a third signal of a digital signal.

According to the embodiment, the third signal can be obtained by carrying out the standardization operation of the first signal and the second signal as digital signals by using a DSP (Digital Signal Processor) or the like.

One embodiment comprises:

a fourth signal processing circuit section which detects a phase of the first digital signal converted by the first analog-to-digital converter circuit and a phase of the second digital signal converted by the second analog-to-digital converter circuit and calculates a phase difference between the first digital signal and the second digital signal.

According to the embodiment, the phase difference between the first signal and the second signal is detected also by digital processing in the fourth signal processing circuit section by using the DSP or the like.

In one embodiment, the first signal processing circuit section has a plurality of amplifier circuit sections that respectively receive a light reception signal from the first photodetector and respectively have band-pass filter characteristics of different bands, the second signal processing circuit section has a plurality of amplifier circuit sections that respectively receive a light reception signal from the second photodetector and respectively have band-pass filter characteristics of different bands, wherein any one of outputs of the plurality of amplifier circuit sections of the first signal processing circuit section is selected, and any one of outputs of the plurality of amplifier circuit sections of the second signal processing circuit section is selected.

According to the embodiment, by using a plurality of amplifier circuit sections that have bandpass filter characteristics of different bands, selecting an optimum output in the stage of small low-frequency noises as the outputs of the first signal processing circuit section and the second signal processing circuit section and carrying out the differential operation of the selected first signal and second signal in the third signal processing circuit section, the noise removal can more reliably be achieved.

Moreover, in a movement information detection system of the present invention, two of the above optical movement information detectors are respectively arranged on coordinate axes of a rectangular coordinate system, and at least a movement velocity is detected in a direction of each coordinate axis of the rectangular coordinates.

According to the movement information detection system of the construction, by arranging two of the constructions described above in the orthogonal directions, the movement of the object to be measured can be detected as two-dimensional information.

Moreover, the optical movement information detector of the present invention comprises:

a semiconductor light-emitting device which emits coherent light;

an optical branching device which splits the light emitted from the semiconductor light-emitting device into a first light flux, a second light flux and a third light flux;

a phase changing section which is arranged on an optical axis of the first light flux and changes a phase of light;

a first optical system which applies the first light flux whose phase is changed by the phase changing section, the second light flux and the third light flux, to an identical spot on a moving object to be measured;

a second optical system which guides interference light caused by the first and second light fluxes out of scattered light from the object to be measured to a first photodetector group comprised of a (1-1)-th photodetector and a (1-2)-th photodetector;

a first interference light splitting section for splitting the interference light caused by the first and second light fluxes of the second optical system into two different phase components having two different phases defined by the phase changing section and making the (1-1)-th and (1-2)-th photodetectors receive the split two different phase components;

a third optical system which guides the interference light caused by the first and third light fluxes out of the scattered light from the object to be measured to a second photodetector group comprised of a (2-1)-th photodetector and a (2-2)-th photodetector;

a second interference light splitting section for splitting the interference light caused by the first and third light fluxes of the third optical system into two different phase components having two different phases defined by the phase changing section and making the (2-1)-th and (2-2)-th photodetectors receive the split two different phase components;

a (1-1)-th signal processing circuit section which receives a light reception signal from the (1-1)-th photodetector and outputs a (1-1)-th signal that represents one phase component of the interference light caused by the first and second light fluxes;

a (1-2)-th signal processing circuit section which receives a light reception signal from the (1-2)-th photodetector and outputs a (1-2)-th signal that represents the other phase component of the interference light caused by the first and second light fluxes;

a (2-1)-th signal processing circuit section which receives a light reception signal from the (2-1)-th photodetector and outputs a (2-1)-th signal that represents one phase component of the interference light caused by the first and third light fluxes;

a (2-2)-th signal processing circuit section which receives a light reception signal from the (2-2)-th photodetector and outputs a (2-2)-th signal that represents the other phase component of the interference light caused by the first and third light fluxes;

a (3-1)-th signal processing circuit section which outputs a (3-1)-th signal of an interference light signal whose noise component is removed by using the (1-1)-th signal from the (1-1)-th signal processing circuit section and the (2-1)-th signal from the (2-1)-th signal processing circuit section;

a (3-2)-th signal processing circuit section which outputs a (3-2)-th signal of an interference light signal whose noise component is removed by using the (1-2)-th signal from the (1-2)-th signal processing circuit section and the (2-2)-th signal from the (2-2)-th signal processing circuit section; and a movement velocity detection section which detects a frequency of the (3-1)-th signal from the (3-1)-th signal processing circuit section, detects a frequency of the (3-2)-th signal from the (3-2)-th signal processing circuit section and detects a movement velocity of the object to be measured on the basis of the frequencies of the (3-1)-th signal and the (3-2)-th signal.

According to the optical movement information detector of the construction, by splitting the interference light caused by the scattered light from the object to be measured, to which the two first and second light fluxes (the first light flux has a phase delay) are applied, into two components of different phases, obtaining the interference light signal, from which the low-frequency noises are effectively removed by using the split two interference light signals, the movement velocity (in the direction along the plane including the first and second light fluxes) can be detected with high accuracy in a wide velocity range on the basis of the interference light signals. Moreover, by splitting the interference light caused by the scattered light from the object to be measured, to which the two first and third light fluxes (the first light flux has a phase delay) are applied, into two components of different phases, obtaining the interference light signal, from which the low-frequency noises are effectively removed by using the split two interference light signals, the movement velocity (in the direction along the plane including the first and third light fluxes) can be detected with high accuracy in a wide velocity range on the basis of the interference light signals.

Therefore, the two-dimensional movement velocity can be detected by the three-light-flux one-point beam spot. Therefore, the device can be further downsized, and cost reduction by a reduction in the parts count can be achieved.

Moreover, it is preferable to use electronic equipment provided with any one of the optical movement information detectors or the movement information detection system.

Moreover, it is most appropriate to use any one of the optical movement information detectors or the movement information detection system as an encoder.

As is apparent from the above, according to the present invention, there is provided an optical movement information detector, which needs neither setting a filter circuit in conformity to the velocity band nor providing a number of filter circuits and has a small size and a wide detection velocity range as well as a movement information detection system, electronic equipment and an encoder having the detector.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 3 is a diagram showing the construction of a modification example of the first embodiment;

FIG. 5 is a diagram showing the construction of yet another modification example of the first embodiment;

FIG. 7 is a graph showing the results of the second embodiment;

FIG. 8A is a diagram showing the construction of an optical movement information detector according to a third embodiment of the present invention;

DETAILED DESCRIPTION OF THE PREFERRED EMBODIMENTS

Figure 1:
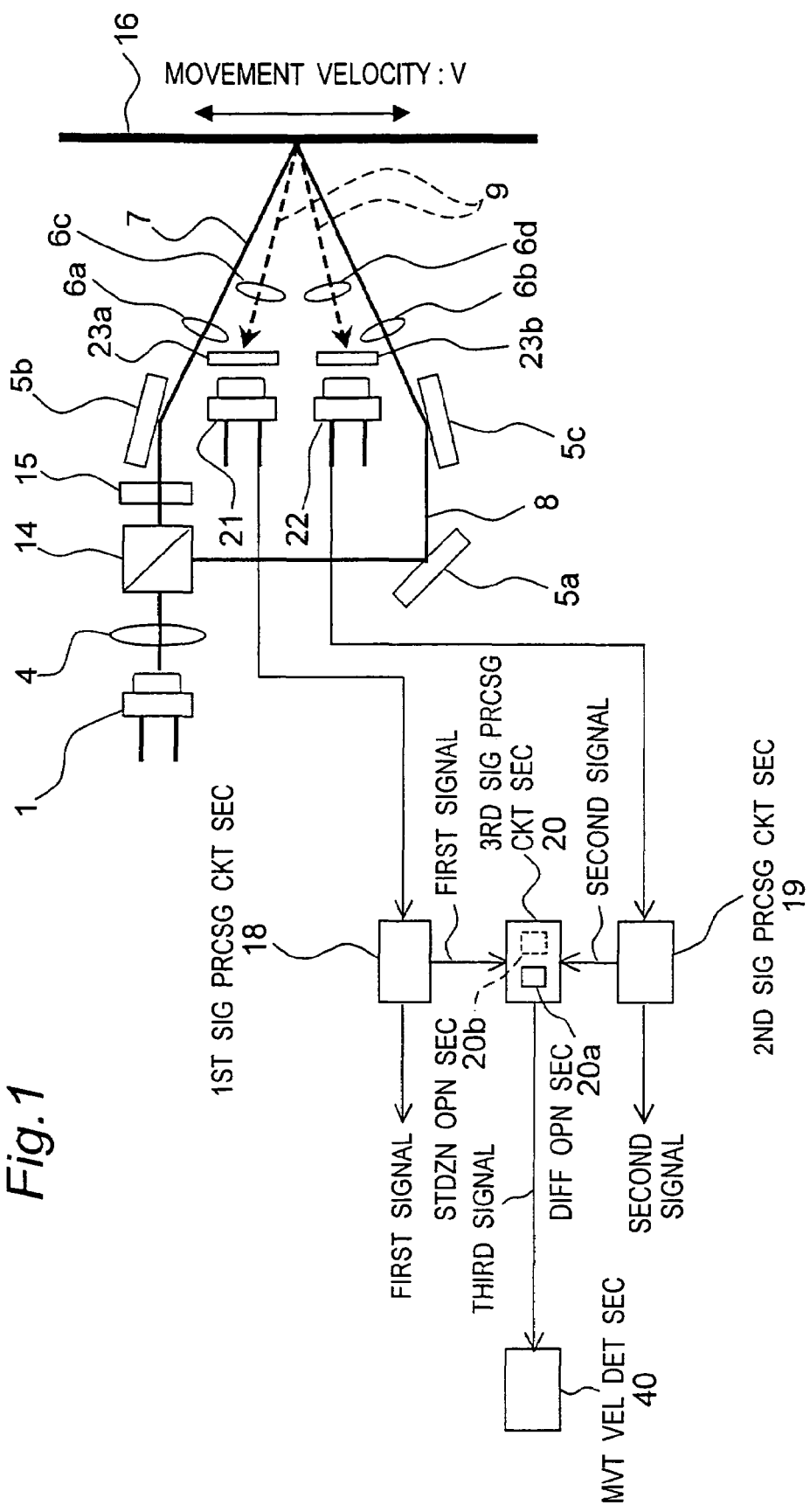
FIG. 1 is a diagram showing the construction of an optical movement information detector according to a first embodiment of the present invention.

The optical movement information detector, the movement information detection system, the electronic equipment and the encoder of the present invention will be described in detail below on the basis of the embodiments thereof shown in the drawings.

The First Embodiment

FIG. 1 is a schematic diagram showing a Doppler velocimeter as one example of an optical movement information detector of the first embodiment of the present invention. FIG. 1 shows the arrangement of optical parts and the tracks of rays of light and so on, and other parts for retaining the optical parts and so on are not shown. In this case, a light source is provided by a light emitting diode (hereinafter, referred to as an LED), a semiconductor laser (hereinafter, referred to as an LD (Laser Diode)) or the like. Although the LD is desirable in order to easily generate a beat caused by the interference of two light fluxes expressed by Equation (3), it is acceptable to employ the LED (e.g., a current constriction mode LED) when coherence is exhibited in the optical path length of the optical system. It is to be noted that the LD is shown as an example in the first embodiment.

Figure 13:
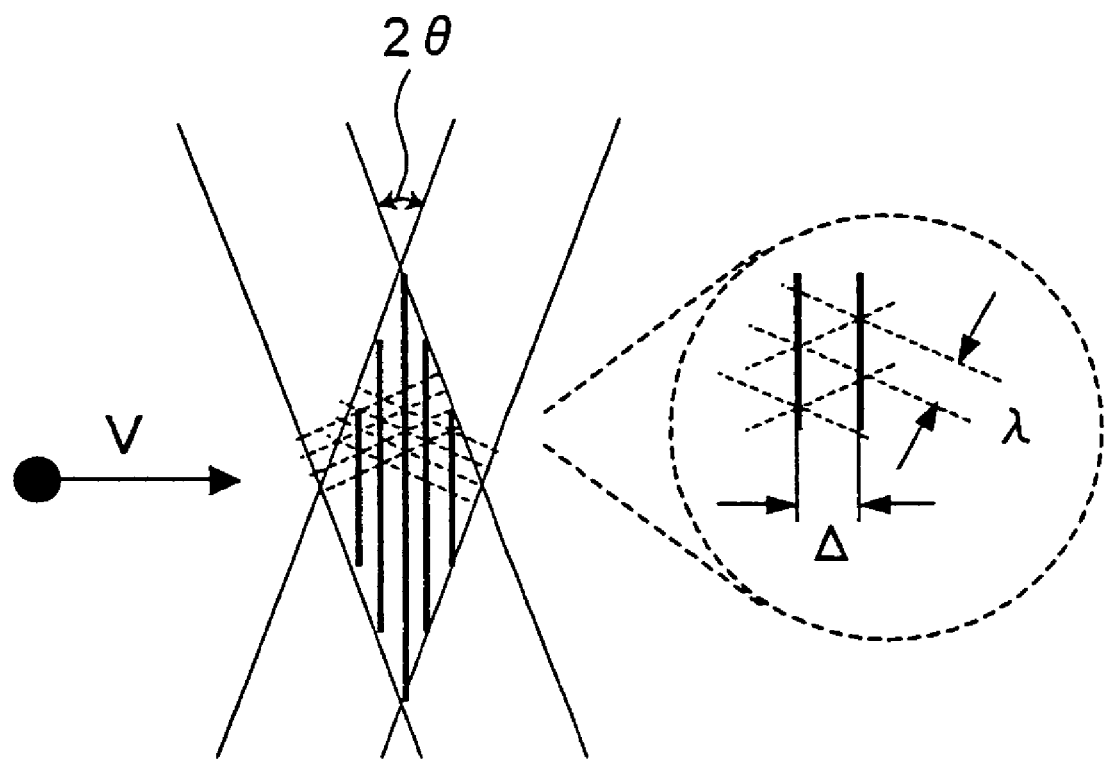
FIG. 13 is an enlarged view showing the overlapping of light fluxes in the vicinity of the LDV detection point.

Light emitted from an LD 1 is converted into a parallel light flux by a collimator lens (hereinafter CL) 4. In general, the intensity distribution of the light emitted from the LD 1 has a Gaussian distribution around its optical axis and comes to have an oval far-field pattern (FFP). Therefore, if the emitted LD light is applied to the detection point as it is, the light intensity becomes uneven at the detection point, and the intensity of the interference fringes shown in FIG. 13 becomes not uniform, making it difficult to evaluate the beat signal with high accuracy. Therefore, it is desirable to provide, for example, a circular aperture diaphragm in order to cut off a portion of a weak light intensity outside the light flux and form a circular light flux of a uniform light intensity. However, no aperture diaphragm is shown in FIG. 1, and neither illustration nor description is hereinafter provided for the aperture diaphragm in all the embodiments. Moreover, although the polarization direction of LD light is unified in the direction perpendicular to all the sheet planes in the first embodiment, the present invention is not limited to this.

After passing through the CL 4, the light is split into a first light flux 7 and a second light flux 8 by a beam splitter (hereinafter, BS) 14 as one example of an optical branching device. Then, a quarter wavelength plate 15 as one example of a phase changing section is arranged so that the phase advance axis and the phase lag axis are inclined at an angle of 45° from the direction perpendicular to the sheet plane. After passing through the quarter wavelength plate 15, the first light flux 7 is transformed from the linearly polarized light into a circularly polarized light. Then, the light is reflected on a mirror 5b, condensed by a condenser lens (hereinafter, OL) 6a and applied to the object 16 to be measured. Moreover, the second light flux 8 is reflected on mirrors 5a and 5c, condensed by an OL 6b and applied to a spot identical to that of the first light flux 7 on the object 16 to be measured. In this case, the OL's 6a and 6b are employed for the purpose of increasing the scattered light intensity from the object 16 to be measured. The OL's are not always necessary constituent elements in a case where the signal intensity is sufficiently great and the signal-to-noise ratio is high without OL's and allowed to be eliminated.

Both the light fluxes scattered by the object 16 to be measured have undergone Doppler frequency shift $f_d$ attributed to the movement velocity V as expressed by Equation (1) and Equation (2), and therefore, the interference light of both the light fluxes becomes an interference light signal (beat signal 9) that has a beat frequency $2f_d$ as expressed by Equation (3). This interference light signal (beat signal 9) spherically expands around the beam spot on the object 16 to be measured. Signals detected by a first PD 21 and a second PD 22 arranged in arbitrary positions come to have an identical frequency as expressed by Equation (8).

In the first embodiment, a linear polarizer 23a is arranged between the first PD 21 and the object 16 to be measured, while a linear polarizer 23b is arranged between the second PD 22 and the object 16 to be measured. The axial directions of the linear polarizers 23a and 23b extend in the same direction as those of the phase advance axis and the phase lag axis, respectively, of the quarter wavelength plate 15, i.e., in the directions inclined at an angle of 45° with respect to the direction perpendicular to the sheet plane. Whichever of the axes of the linear polarizers 23a and 23b may extend in the direction along the phase advance axis or the phase lag axis and not determinative, it is impermissible to direct both the linear polarizers 23a and 23b in the same axial direction. The linear polarizers 23a and 23b are examples of an interference light splitting section.

The LD 1, the CL 4, the BS 14, the quarter wavelength plate 15, the mirrors 5a, 5b and 5c and the OL's 6a and 6b constitute a first optical system by which the first light flux 7 and the second light flux 8 are applied to the object 16 to be measured. Moreover, the OL 6c and OL 6d and the linear polarizers 23a and 23b constitute a second optical system by which the interference light signals caused by the scattered light of the first light flux 7 and the second light flux 8 from the object 16 to be measured are guided to the first PD 21 and the second PD 22.

Next, in FIG. 1, the signals inputted to the first PD 21 and the second PD 22 are condensed by the OL's 6c and 6d, which are employed for the purpose of increasing the solid angles of the received lights and the signal-to-noise ratio and allowed to be eliminated as occasion demands similarly to the OL's 6a and 6b of the light-applying system.

A beat signal 9a and a beat signal 9b received by the first PD 21 and the second PD 22, respectively, by means of the optical system of the above construction will be described in detail. The light flux emitted from the LD 1 is expressed by:

$$E_0 \cos(2\pi f_0 t)$$

and therefore, the first light flux 7 and the second light flux 8 split by the BS 14 can be expressed by Equations (12):

$$\text{First Light Flux} = E_{01} \cdot \cos\{2\pi f_0 t + \phi_1\}$$

$$\text{Second Light Flux} = E_{02} \cdot \cos\{2\pi f_0 t + \phi_2\}$$

where $E_0 = E_{01} + E_{02}$.

In this case, $E_0$ represents the amplitude of the light that has become a circular parallel light flux after passing through the CL 4 and the circular aperture diaphragm, $E_{01}$ represents the amplitude of the first light flux 7, $E_{02}$ represents the amplitude of the second light flux 8, $f_0$ represents the frequency of light, t represents time, and $\phi 1$ and $\phi 2$ represent the phases of the first light flux 7 and the second light flux 8, respectively. The first light flux 7 is converted into a circularly polarized light by the quarter wavelength plate 15 as described hereinabove and able to be expressed by Equations (13):

Phase Advance Axis Component $\dfrac{E_{01}}{\sqrt{2}} \cdot \cos\{2\pi f_0 t + \phi_1\}$ Phase Lag Axis Component $\dfrac{E_{01}}{\sqrt{2}} \cdot \cos\{2\pi f_0 t + \phi_1 + \dfrac{\pi}{2}\}$ If these light fluxes are scattered by the object 16 to be measured moving at a velocity V, then a Doppler frequency shift (shift amount: $f_d$) attributed to the movement velocity occurs. Assuming that the movement in the upper direction on the sheet plane of FIG. 1 is the positive direction and the amplitudes of the scattered lights of the first light flux 7 and the second light flux 8 are $E_1$ and $E_2$, respectively, then the scattered lights can be expressed by Equation (14a):
First Light Flux (Phase Advance Axis Component) =
$$\dfrac{E_1}{\sqrt{2}} \cdot \cos\{2\pi(f_0 \pm f_d)t + \phi_1\}$$

Equation (14b):
First Light Flux (Phase Lag Axis Component) =
$$\dfrac{E_1}{\sqrt{2}} \cdot \cos\{2\pi(f_0 \pm f_d)t + \phi_1 + \dfrac{\pi}{2}\}$$

Equation (14c):
Second Light Flux = $E_2 \cdot \cos\{2\pi(f_0 \mp f_d)t + \phi_2\}$ and therefore, the beat signal 9 of the diffused lights of both the light fluxes can be expressed by Equation (15a):
Phase Advance Axis Component = $\dfrac{E_1^2 + E_2^2}{4} + \dfrac{E_1 \cdot E_2}{2} \cdot \cos\{2\pi(2f_d)t\}$ Equation (15b):
Phase Lag Axis Component == $\dfrac{E_1^2 + E_2^2}{4} + \dfrac{E_1 \cdot E_2}{2} \cdot \cos\{2\pi(2f_d)t \pm \dfrac{\pi}{2}\}$ Although the phase difference component ($\phi_1 - \phi_2$) of the first light flux 7 and the second light flux 8 is produced through the calculations for deriving Equation (15a) and Equation (15b) from Equation (14a), Equation (14b) and Equation (14c), the phase difference component is eliminated from Equation (15a) and Equation (15b). This is because the phase difference between both the light fluxes is mainly attributed to the optical path difference, and the magnitude is sufficiently small with respect to the wavelength of the beat signal 9. In FIG. 1, the phase difference component ($\phi_1 - \phi_2$) corresponds to a distance between the BS 14 and the mirror 5a and is almost on the order of millimeters to the order of centimeters also depending on the size of the optical system. In contrast to this, the frequency: $2f_d$ of the beat signal is generally almost several tens of megahertz on the high-frequency side, and the wavelength is on the order of meters or greater than the order. Therefore, the phase difference component attributed to the optical path difference can be ignored.

Assuming now that the penetration axis of the linear polarizer 23a provided just before the first PD 21 is provided in the same direction as that of the phase advance axis of the quarter wavelength plate 15, and the penetration axis of the linear polarizer 23b provided just before the second PD 22 is provided in the same direction as that of the phase lag axis, then the beat signal expressed by Equation (15a) and the beat signal expressed by the Equation (15b) are detected in the first PD 21 and the second PD 22, respectively.

Figure 14:
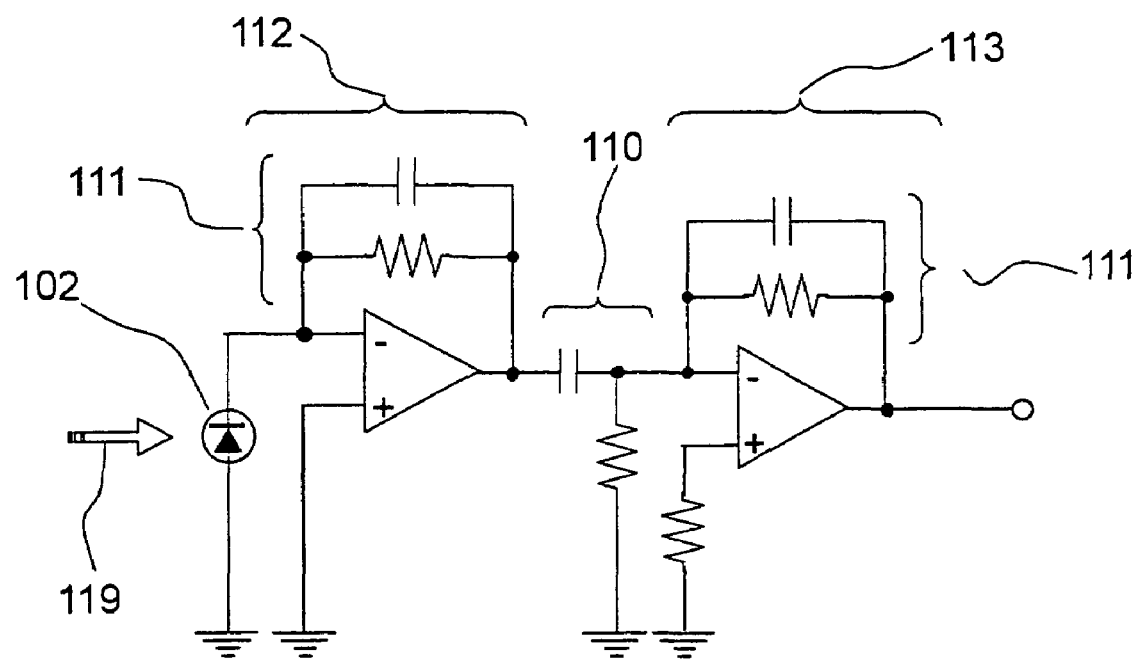
FIG. 14 is a diagram showing a signal processing circuit of the conventional LDV.

The above description is based on the ideal case in which the scattering of light from the object 16 to be measured uniformly occurs, and a signal that includes low-frequency and high-frequency noises actually results. Strictly, the actual signal becomes a complex signal attributed to a plurality of parameters of speckles, the coherence of LD light, the degree of overlap of beam spots and so on. If these factors are ignored for the sake of easy understanding, then the signal detected by the PD 21 and 22 is to be modulated by the high-frequency and low-frequency noise components with respect to the beat signal expressed by Equation (15a) and Equation (15b). Generally, in an LDV, high-frequency noises exhibit an almost constant frequency regardless of the magnitude of the movement velocity of the object to be measured similarly to the general electronic circuits and electronic equipment. However, the low-frequency noises are mainly attributed to the variation in the intensity of scattered light in accordance with the movement of the object 16 to be measured whose surface reflectance of light is varied depending on the position. Therefore, the frequency becomes higher with an increase in the movement velocity of the object to be measured, and the frequency becomes lower with a reduction in the movement velocity. Assuming that the high-frequency noise is $N_h$ and the low-frequency noise is $N_l$ (V), then first and second signals detected by the PD 21 and the PD 22 are expressed by Equation (16a):

First Signal = $\{N_h + N_l(V)\} \cdot \left[\dfrac{E_1^2 + E_2^2}{4} + \dfrac{E_1 \cdot E_2}{2} \cdot \cos\{2\pi(2f_d)t\}\right]$ Equation (16b):

Second Signal = $\{N_h + N_l(V)\} \cdot \left[\dfrac{E_1^2 + E_2^2}{4} + \dfrac{E_1 \cdot E_2}{2} \cdot \cos\{2\pi(2f_d)t \pm \dfrac{\pi}{2}\}\right]$ These signals are subjected to amplification and waveform shaping in an amplifier circuit that has an HPF 110 and LPF's 112 and 113 (111 denotes resistors and capacitors that determine the time constant) as shown in, for example, FIG. 14. As described above, the high-frequency noises $N_h$, which have no relation to the movement velocity of the object 16 to be measured, can therefore be comparatively easily removed by setting the cutoff frequency: $fc_l$ of the LPF's 112 and 113 lower than the noise frequency. However, since the low-frequency noise changes in accordance with the magnitude of the movement velocity, it becomes difficult to detect the beat frequency $2f_d$ with high accuracy. This is because the first signal and the second signal become signals that have large low-frequency waves when the velocity to be detected becomes fast and the frequency of $N_l$ (V) exceeds $fc_h$ in the signal processing circuit that employs an HPF 110 having a cutoff frequency of a certain constant value: $fc_h$ as shown in FIG. 14. It is necessary to count every one pulse to increase the resolutions of the velocity and the displacement magnitude, whereas the signal that has waves makes it very difficult.

Figure 2:
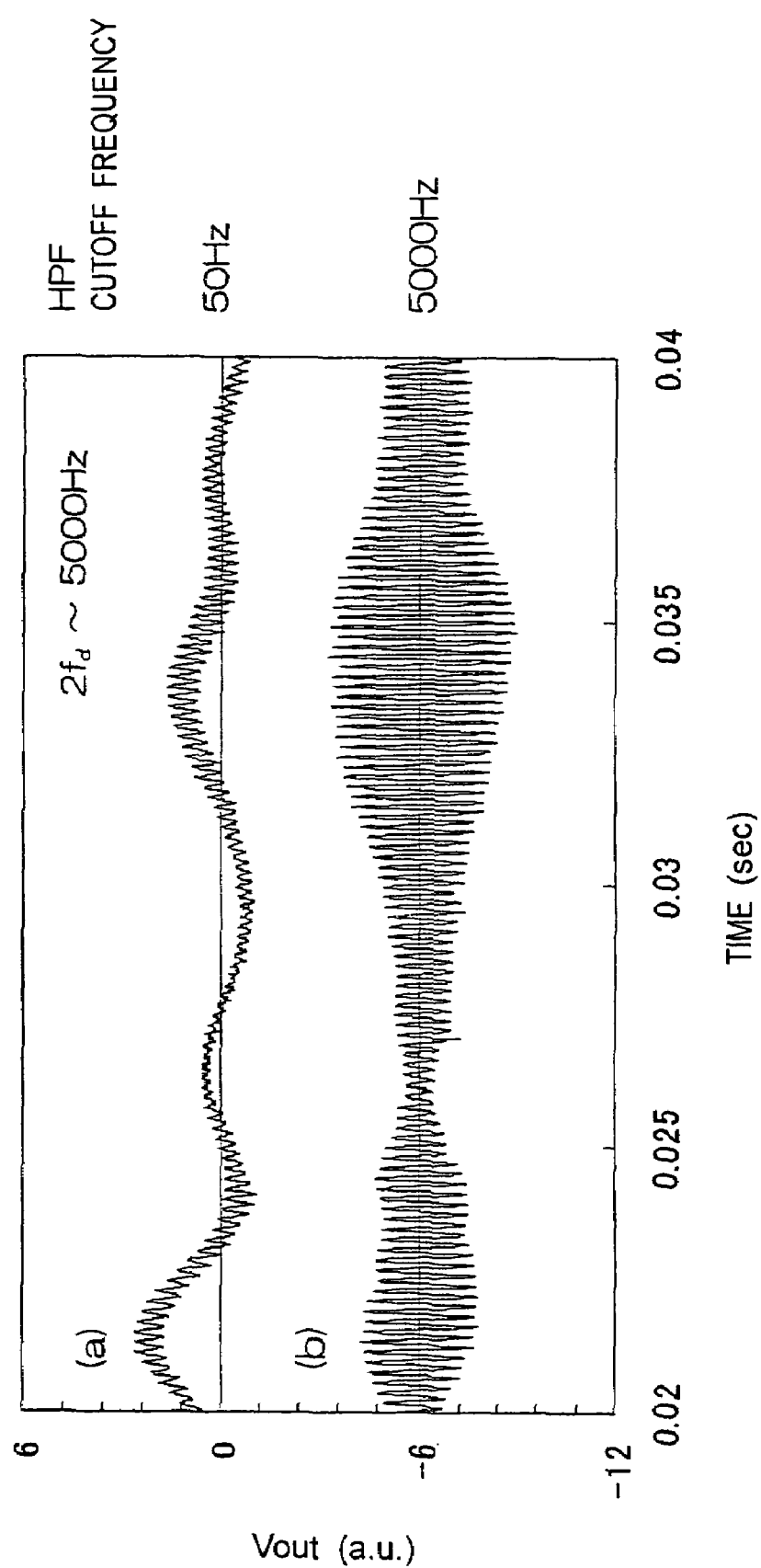
FIG. 2 is a graph showing beat signal waveforms of different HPF cutoff frequencies.

FIG. 2 shows the detection results of the beat signal 9 when the circuit of FIG. 14 is employed as the first signal processing circuit section 18, two kinds of HPF cutoff frequencies of 50 Hz ((a) in FIG. 2) and 5000 Hz ((b) in FIG. 2) are prepared with the LPF cutoff frequency fixed at 50 kHz, and the object 16 to be measured is moved at same velocity ($2f_d$ to 5000 Hz). As shown in FIG. 2, the low-frequency noises having a frequency of about 200 Hz are detected when the cutoff frequency is set at 50 Hz, and this makes frequency detection using pulse count, FFT (Fast Fourier Transform) or the like difficult. The problem becomes a serious hindrance in widening the detectable velocity band.

Referring to the example of FIG. 2, a ratio of the low-frequency noise (about 200 Hz) and the beat frequency (about 5000 Hz) is 1:25. As expressed by Equation (9) and Equation (11), the beat frequency is proportional to the movement velocity, and the low-frequency noise, which is ascribed to the variation in the position of the surface reflectance of the object to be measured, is therefore proportional to the movement velocity. Therefore, the frequency ratio of the noise to the signal is fixed at about 1:25. Also, in the circuit in which the HPF cutoff frequency is set at 5000 Hz, if the movement velocity increases and becomes 25 times that of the velocity of FIG. 2, then the low-frequency noises disadvantageously exceed 5000 Hz to reach the passband of the filter and comes to have a waveform having waves as shown in FIG. 2(a).

In the first embodiment, the first signal and the second signal, which are the outputs of the first signal processing circuit section 18 and the second signal processing circuit section 19, are inputted to the third signal processing circuit section 20. The third signal processing circuit section 20 has a circuit construction that cancels the noise components in the first signal and the second signal. In concrete, the circuit construction includes a differential operation section 20a for carrying out differential operation. Moreover, the optical movement information detector includes a movement velocity detection section 40 that detects the frequency of a third signal from the third signal processing circuit section 20 and detects the movement velocity of the object 16 to be measured on the basis of the frequency.

If the second signal expressed by Equation (16b) is subtracted from the first signal expressed by Equation (16a), then the principal noise components are canceled, and the beat signal, of which the phase is shifted by π/2, is not canceled and becomes expressed by:

Equation (17):
$$\text{Third Signal} = \{N_h + N_l(V)\} \cdot \left[\frac{E_1 \cdot E_2}{\sqrt{2}} \cdot \cos\{2\pi(2f_d)t \pm \frac{\pi}{4}\}\right]$$

so that the components of waves can be removed and a frequency counter can be used in the movement velocity detection section 40. Therefore, the displacement magnitude detection by the time measurement of one pulse can be made highly accurate.

As described above, according to the optical movement information detector of the above construction, the interference light caused by the scattered light from the object 16 to be measured, to which the two of the first and second light fluxes 7 and 8 (the first light flux 7 has a phase delay) are applied, are split into two components of different phases. An interference light signal, from which the low-frequency noises are effectively removed, is obtained by using the split two interference light signals, and the movement velocity of the object 16 to be measured can be detected with high accuracy within a wide velocity range on the basis of the interference light signals.

Moreover, the first photodetector 21 and the second photodetector 22 receive interference light caused by the scattered lights from the identical detection point of the object 16 to be measured, and therefore, an interference light signal, from which the low-frequency noises are effectively removed, can be obtained.

FIG. 3 shows a modification example of the first embodiment. In FIG. 3, the same constituent elements as those of FIG. 1 are denoted by same reference numerals, and the parts for retaining the optical parts and so on are not shown similarly to FIG. 1. Moreover, in the present modification example, only the parts different from those of FIG. 1 will be described.

In the structural example of FIG. 3, an identical OL 6 is employed in the light-applying system and the light-receiving system, and the object 16 to be measured is arranged in the focal distance position of the OL 6. The other constructions are the same as those of FIG. 1. The first light flux 7 transformed into a circularly polarized light by the quarter wavelength plate 15 and the second light flux 8 reflected on the mirror 5 are concentrated on the object 16 to be measured by the identical OL 6, forming a beam spot. The beat signal 9, which is spherically scattered around the beam spot on the object 16 to be measured, passes through the identical OL 6 to become a parallel light flux from the spherical wave and is received by the first PD 21 and the second PD 22 through the linear polarizers 23a and 23b. The subsequent signal processing is the same as that of the first embodiment.

Since the low-frequency noise component is ascribed to the variation in the surface reflection of the object 16 to be measured, if the light reception spots for the first PD 21 and the second PD 22 are different form each other, then the phase of the low-frequency noise is varied, and the noise component is not canceled when differential operation is carried out in the third signal processing circuit section 20. In this modification example, the condenser lens, which guides the beat signal 9 to the first PD 21 and the second PD 22, is the identical lens, and therefore, the scattered lights from the identical beam spot can reliably be received. Therefore, the low-frequency noises can efficiently be removed by the differential operation in the third signal processing circuit section 20.

Figure 4A:
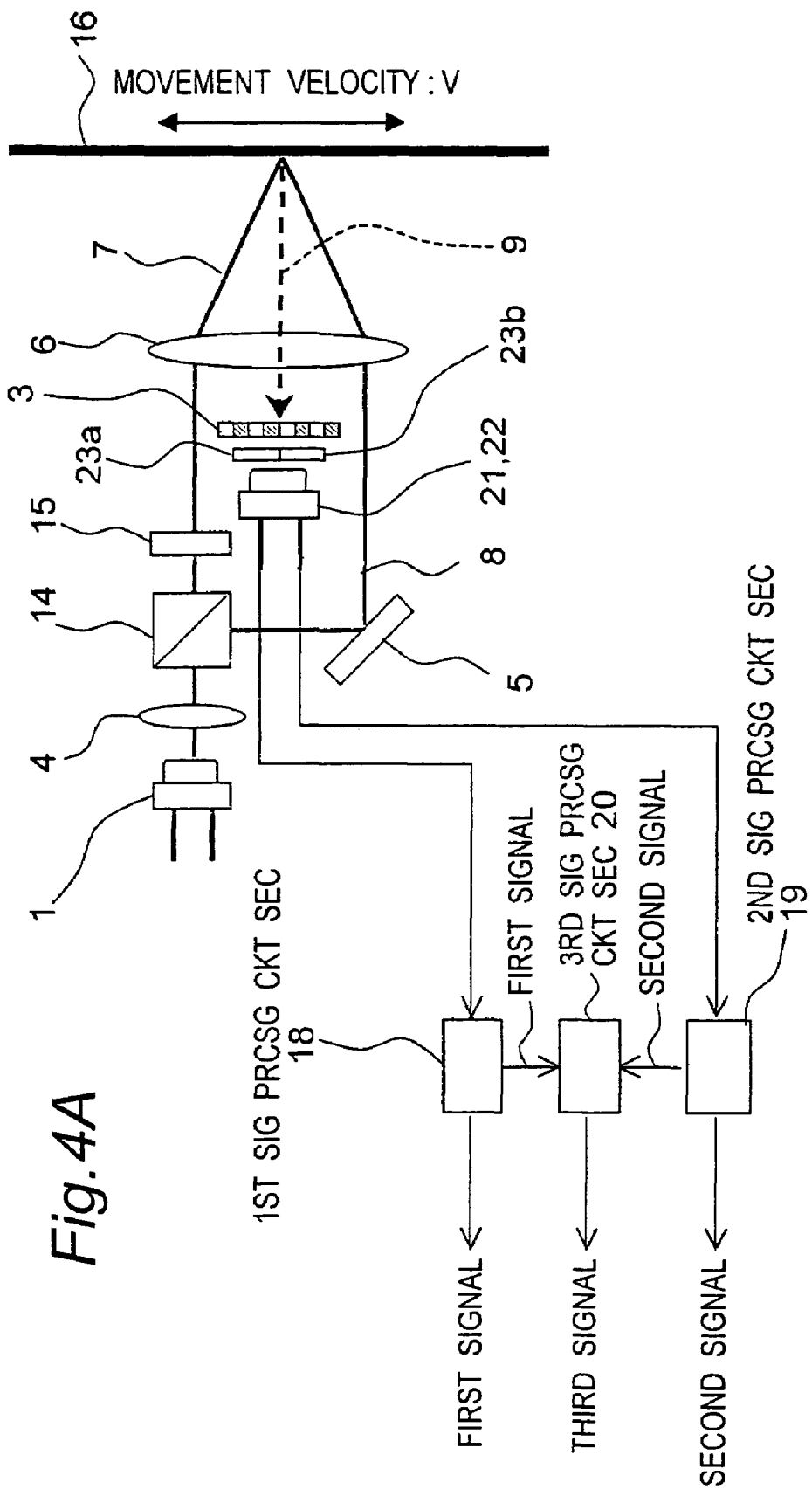
FIG. 4A is a diagram showing the construction of another modification example of the first embodiment.
Figure 4B:
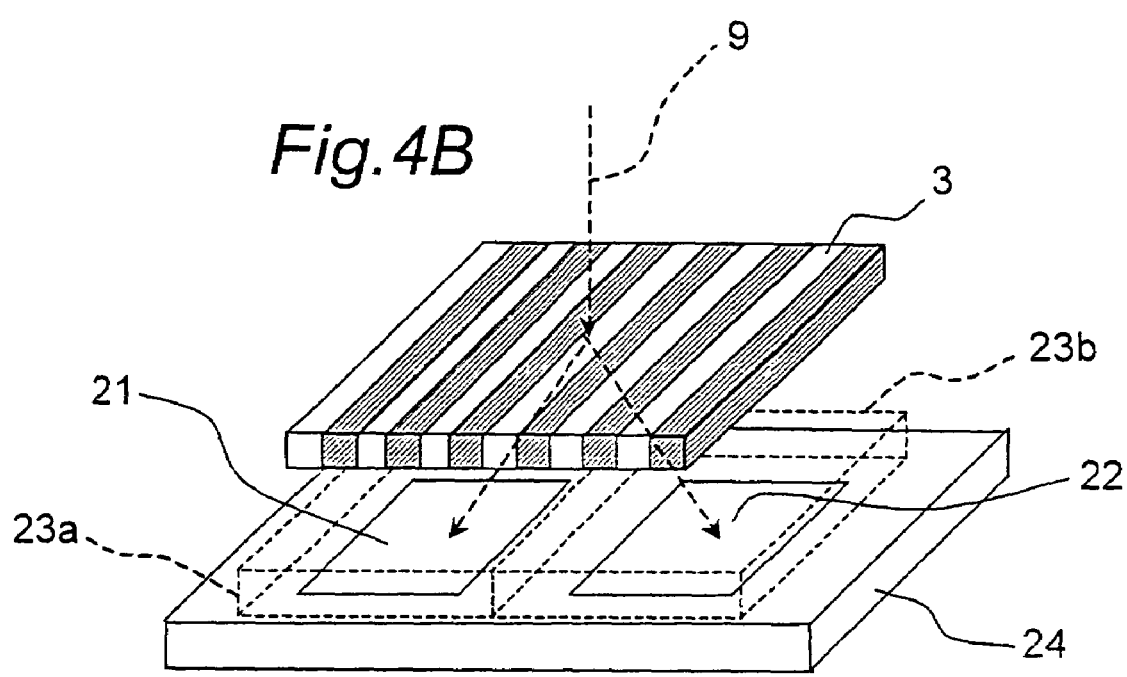
FIG. 4B is an enlarged view of a photodetection section in FIG. 4A.

FIGS. 4A and 4B show another modification example of the first embodiment. In FIGS. 4A and 4B, the same constituent elements as those of FIG. 3 are denoted by the same reference numerals, and the parts for retaining the optical parts and so on are not shown similarly to FIG. 3. Moreover, in the present modification example, only the parts different from those of FIG. 1 will be described. FIG. 4B shows an enlarged view of the photodetection section, and the linear polarizers 23a and 23b are indicated by dotted lines for the sake of a clear view.

In the structural example of FIGS. 4A and 4B, the beat signal 9 collimated by the OL 6 is split by a transmission mode diffraction grating 3 of one example of an interference light splitting section. The transmission mode diffraction grating 3 produces positive and negative n-th order (n: natural number including zero) diffracted lights, and the quantity of light of the order of diffraction is maximized by utilizing positive and negative first order diffracted lights. Moreover, a beam splitter (not shown) may be employed in place of the diffraction grating as one example of the interference light splitting section for splitting the beat signal 9.

The beat signals 9 split by the diffraction grating 3 pass through the linear polarizers 23a and 23b and made incident and received on the first PD 21 and the second PD 22 formed on an identical semiconductor substrate 24. The construction of the succeeding signal processing circuit section is the same as those of FIGS. 1 and 3.

In the present modification example, the first PD 21 and the second PD 22 are formed in one chip on an identical semiconductor substrate 24, and therefore, the device can be downsized. Moreover, the first PD 21 and the second PD 22 formed on the identical semiconductor substrate 24 can be further downsized when they are segmented photodiodes since the semiconductor substrate 24 can be further shrunk in size. In this case, the segmented photodiodes are photodiodes that have a structure which is formed by using, for example, the normal semiconductor manufacturing processes and in which a cathode region formed of an n-type semiconductor is separated by a p-type semiconductor, allowing a distance between the PD's to be reduced.

In the first embodiment, the "differential Doppler velocimeter" that applies two light fluxes to an identical spot on the object to be measured and detects the beat signal obtained by scattering has been described in all of the structural examples shown in FIGS. 1 through 4A and 4B. However, as shown in FIG. 5, a "reference Doppler velocimeter" that applies only one light flux to the object to be measured may substitute. No detailed description is provided for the arrangement of the optical parts and so on. In the "reference Doppler velocimeter", only the first light flux 7 is applied to the object to be measured, and the scattered light that has undergone the Doppler frequency shift $f_d$ and the second light flux 8 of the circularly polarized light are made to interfere with each other by an HM (Half Mirror) 17, obtaining an interference light 9. The contents concerning the succeeding detection system and signal processing are the same as those of the first embodiment and the modification examples.

The modification examples can also be applied to the following embodiments, and no further description is provided therefor.

The Second Embodiment

The first signal and the second signal outputted from the first signal processing circuit section 18 and the second signal processing circuit section 19 in the first embodiment and the modification examples will be examined next more in detail.

In all the examples of FIGS. 1, 2, 4A, 4B and 5, a difference in the signal intensity occurs between the first signal and the second signal that are the outputs of the first signal processing circuit section 18 and the second signal processing circuit section 19 mainly because of the following five factors.

(1) Variation in the light quantity split ratio of BS 14

(2) Angular deviation of the polarization direction of light incident on the quarter wavelength plate 15 with respect to the optical axis If the angle between the polarization direction of the incident light and the optical axis of the quarter wavelength plate 15 deviates from 45°, then a ratio of vector resolution of the amplitude of light to the phase advance axis and the phase lag axis deviates from 1:1.

(3) Light quantity loss at the time of reflection on the mirror 5 and the mirror 5a (4) Variation in the sensitivity of the photodiode (5) Variation in the degree of amplification of the amplifier circuit Only in the structural example shown in FIG. 1, the beat signals inputted to the first PD 21 and the second PD 22 are condensed by the separate lenses of OL 6c and OL 6d, respectively. Therefore, the condensed beam spot diameter on the object 16 to be measured is varied by an error concerning the arrangement, and a difference in the quantity of received light occurs. Moreover, a difference in the quantity of received light occurs between the first PD 21 and the second PD 22 depending on the variation in the loss due to the reflection on the mirrors 5b and 5c and the deviation of the incident angle due to the mirror angle. Therefore, a difference in the signal intensity occurs between the first signal and the second signal that are the outputs of the first signal processing circuit section 18 and the second signal processing circuit section 19.

Moreover, since the two light fluxes are condensed by the identical OL 6 only in the structural examples shown in FIGS. 3 and 4A and 4B, the distance to the object to be measured is changed if the setting angle of the OL 6 is deviated with respect to both the light fluxes. Therefore, a difference occurs in the quantity density of received light between both the light fluxes on the object to be measured, and consequently a difference occurs in the quantity of received light between the first PD 21 and the second PD 22. Therefore, a difference in the signal intensity occurs between the first signal and the second signal that are the outputs of the first signal processing circuit section 18 and the second signal processing circuit section 19.

As described above, since the difference occurs in the quantity of light received by the first PD 21 and the second PD 22 due to the various factors, it is very difficult to make the signal intensities of the first signal and the second signal equal to each other in the actual device. When the signal intensities of the first signal and the second signal are different from each other, the signals detected by the first PD 21 and second PD 22 become expressed by Equation (18a):

$$\text{First } PD \text{ detection signal} = \alpha \cdot \{N_h + N_l(V)\} \cdot \left[\frac{E_1^2 + E_2^2}{4} + \frac{E_1 \cdot E_2}{2} \cdot \cos\{2\pi(2f_d)t\}\right]$$

Equation (18b):

$$\text{Second } PD \text{ detection signal} = \beta \cdot \{N_h + N_l(V)\} \cdot \left[\frac{E_1^2 + E_2^2}{4} + \frac{E_1 \cdot E_2}{2} \cdot \cos\{2\pi(2f_d)t \pm \frac{\pi}{2}\}\right]$$

In the above equations, $\alpha$ and $\beta$ are coefficients. Even if both the signals are inputted to the third signal processing circuit section 20 that carries out the differential operation of the second embodiment, the noise component is not removed from the outputted third signal.

The second embodiment has a construction in which the signal intensities of the first signal and the second signal inputted to the third signal processing circuit section 20 are standardized by the standardization operation section 20b (indicated by the dashed lines in FIG. 1), and thereafter, the differential operation is carried out by the differential operation section 20a (shown in FIG. 1). The other constituent components of the optical parts, the signal processing circuit and so on are the same as those of the first embodiment. For example, by multiplying the signal intensity of Equation (18b) by α/β, the noise components of Equation (18a) and Equation (18b) can effectively be removed by the differential operation section 20a. In this case, the coefficients α and β of the signal intensity are obtained by detecting the maximum value of each of the signals by means of a general peak hold circuit. Moreover, it is acceptable to similarly detect the minimum value by means of a negative peak hold circuit or use both the values in order to improve the accuracy of standardization. Further, it is acceptable to carry out standardization by the amplitude by means of a peak-to-peak (Vpp) detection circuit.

Figure 6:
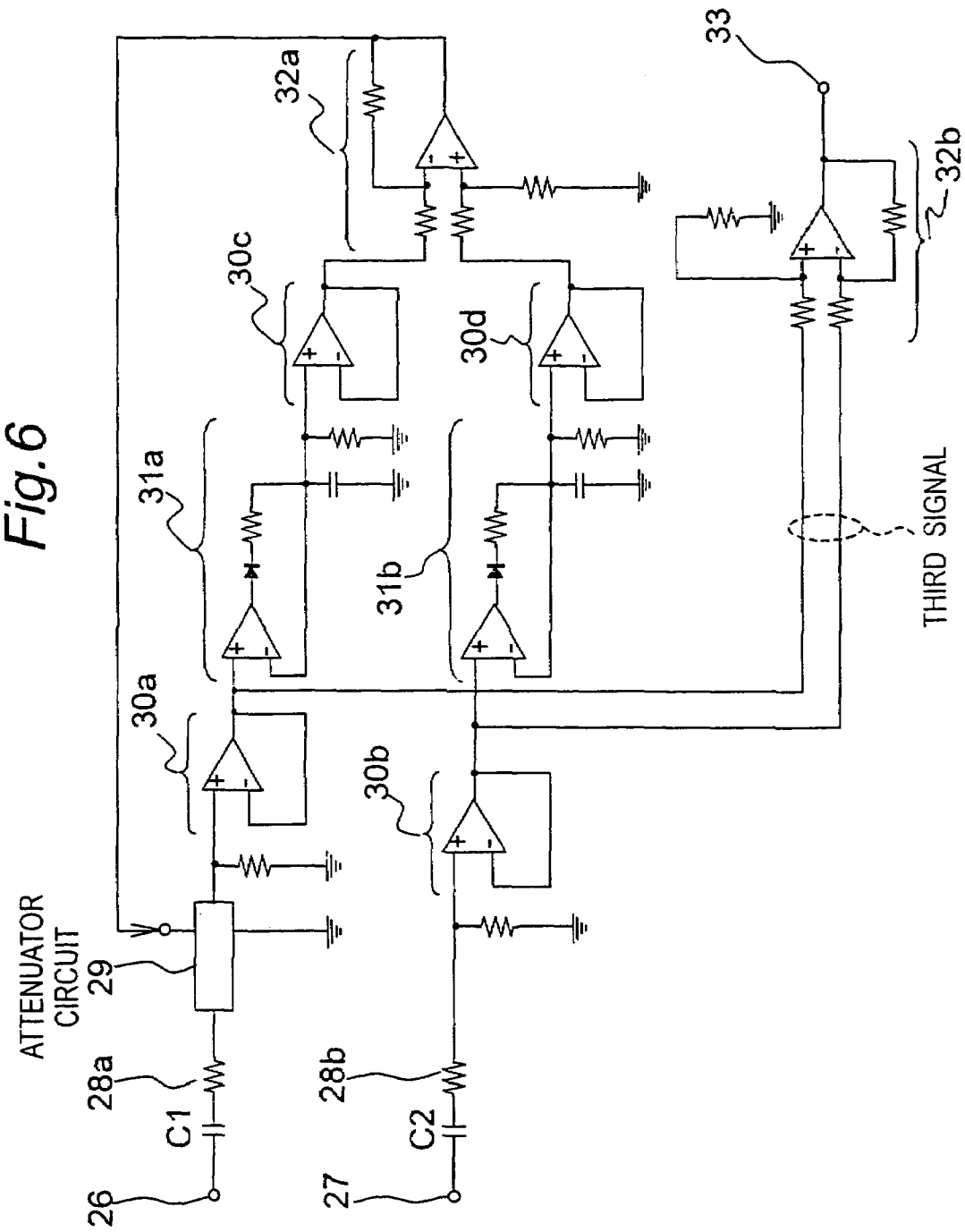
FIG. 6 is a circuit diagram showing the construction of a third signal processing circuit section of the optical movement information detector according to a second embodiment of the present invention.

FIG. 6 shows one example of the circuit of the third signal processing circuit section 20. The first signal, which is the output from the first signal processing circuit section 18, is inputted to a first input terminal 26. The inputted first signal has its DC (Direct Current) component cut off by a capacitor C1, its voltage signal converted into a current signal by a first resistor 28a for current conversion and then inputted to an attenuator circuit 29. In this case, the attenuator circuit 29 is a circuit for adjusting the gain in accordance with an external input signal.

Moreover, the second signal, which is the output from the second signal processing circuit section 19, is inputted to a second input terminal 27. The inputted second signal has its DC component cut off by a capacitor C2 and its voltage signal converted into a current signal by a second resistor 28b for current conversion. Next, the first signal outputted from the attenuator circuit 29 and the second signal converted into a current are inputted to peak hold circuits 31a and 31b, respectively, via buffer circuits 30a and 30, respectively. The peak hold circuits 31a and 31b hold the maximum values of the first signal and the second signal with attenuation of a time constant CR and outputs the values. The maximum values of the signals detected by the peak hold circuits 31a and 31b are inputted to a differential amplifier circuit section 32a via buffer circuits 30c and 30d, respectively, and a difference between the maximum values of the first signal and the second signal is detected. The difference between the maximum values is inputted as a feedback to the attenuator circuit 29, and the gain of the attenuator circuit 29 is finely tuned so that the difference disappears.

The first resistor 28a for current conversion, the second resistor 28b for current conversion, the attenuator circuit 29, the buffer circuits 30a, 30b, 30c and 30d and the differential amplifier circuit section 32a constitute the standardization operation section. The differential amplifier circuit section 32b constitutes the differential operation section.

The standardization of the first signal and the second signal is carried out as described above, so that the signal intensities of the first signal and the second signal are almost equalized. The differential operation of the first signal and the second signal expressed by Equation (16a) and Equation (16b) is carried out in the differential amplifier circuit section 32b, and the third signal expressed by Equation (17) is outputted from an output terminal 33.

FIG. 7 shows the first signal, the second signal and the third signal measured by the present circuit construction. The large low-frequency noises observed in the first signal and the second signal are removed in the third signal, and this makes it possible to carry out the measurement of a highly accurate displacement magnitude by the timewise measurement carried out every one pulse.

Moreover, the value of the first resistor 28a for current input conversion is smaller than the value of the second resistor 28b for current input conversion. Since the gain of the attenuator circuit 29 attenuates the signal intensity and adjusts its gain, the standardization cannot be achieved by gain adjustment if the signal intensity of the first signal is smaller than the signal intensity of the second signal. Therefore, the signal intensity of the inputted second signal can preparatorily be reduced by making the value of the second resistor 28b for current input conversion greater than that of the first resistor 28a for current input conversion, and therefore, the standardization is reliably carried out.

The first signal processing circuit section 18, the second signal processing circuit section 19 and the third signal processing circuit section 20 shown in FIG. 6 are all analog operation circuits. Therefore, the first PD 21, the second PD 22, the first signal processing circuit section 18, the second signal processing circuit section 19 and the third signal processing circuit section 20 can be fabricated on an identical semiconductor substrate by using the normal semiconductor manufacturing processes into a signal processing circuit built-in type photodetector device. Since the sections are formed in one chip so as to carry out the reception of light of the beat signal 9 and the signal processing on the identical substrate, the device can be largely downsized, and the parts count is reduced, allowing cost reduction to be achieved.

The Third Embodiment

Figure 8B:
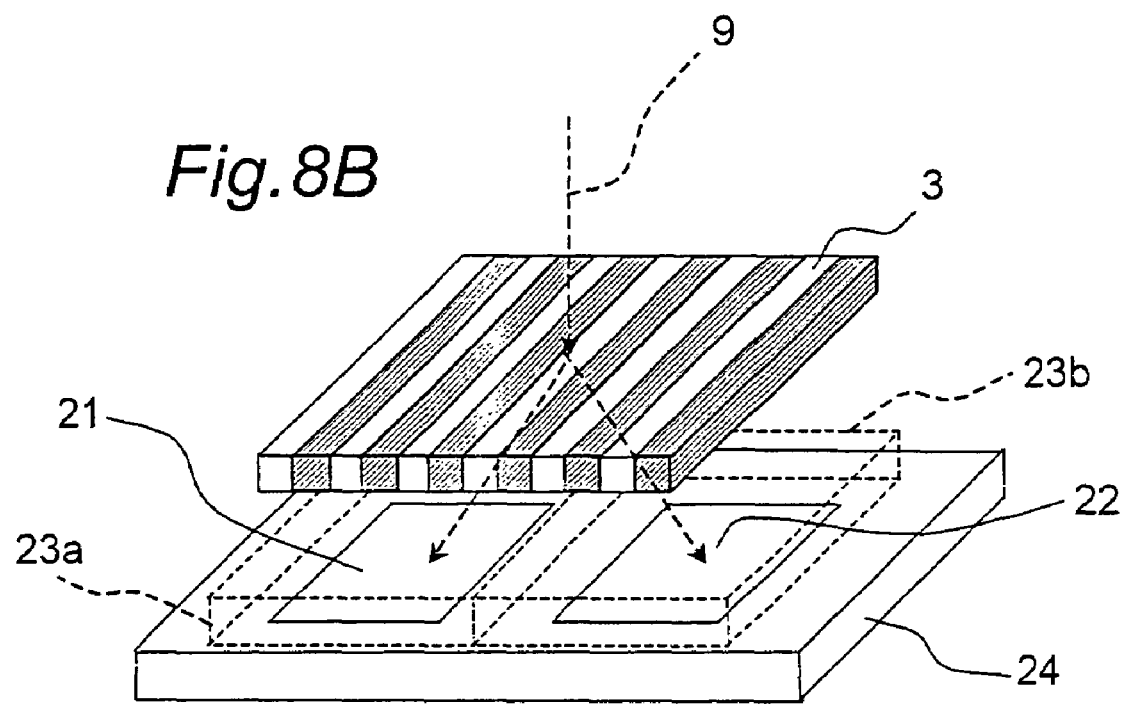
FIG. 8B is an enlarged view of a photodetection section in FIG. 8A.

FIGS. 8A and 8B are diagrams showing the third embodiment of the present invention. In FIGS. 8A and 8B, the same constituent elements as those of FIGS. 4A and 4B are denoted by same reference numerals, and only parts different from those of FIGS. 4A and 4B will be described in the present embodiment. FIGS. 8A and 8B show the arrangement of the optical parts, tracks of rays of light and so on, and no description is provided for other parts that retain the optical parts and so on.

In the structural example of FIGS. 8A and 8B, the beat signals received by the first PD 21 and the second PD 22 are subjected to noise removal and amplification in the first signal processing circuit section 18 and the second signal processing circuit section 19, respectively. The first signal from the first signal processing circuit section 18 and the second signal from the second signal processing circuit section 19 are inputted to the third signal processing circuit section 20, and the standardization of the first signal and the second signal and the differential operation thereof are carried out to output the third signal. At the same time, the first signal processing circuit section 18 and the second signal processing circuit section 19 output the first signal and the second signal in parallel with those, and the signals are inputted to a fourth signal processing circuit section 25 as one example of a phase difference detection section. In the fourth signal processing circuit section 25, the phases of the inputted first signal and second signal are detected, and a difference between them is detected to output a fourth signal that represents the phase difference. On the basis of the phase difference detected by the fourth signal processing circuit section 25, the movement direction of the object 16 to be measured is detected by a movement direction detection section 41.

In this case, the sign of the phase of Equation (16b) becomes positive when the object 16 to be measured moves upward in FIG. 8A, and the sign becomes negative when the object moves downward. Although the phase components are based on zero in Equation (16a) and Equation (16b), the signals actually detected by the first PD 21 and the second PD 22 have an arbitrary phase component φ, which is omitted from Equation (16a) and Equation (16b). Therefore, the value of the phase detected from the first signal is always φ regardless of the movement direction of the object to be measured, and the value of the phase detected from the second signal becomes φ+π/2 or φ−π/2 depending on the movement direction. Therefore, the output of the fourth signal, which is the output of the fourth signal processing circuit section 25, becomes "+π/2" when the object 16 to be measured is moving upward and becomes "−π/2" when the object is moving downward. As described above, by detecting the positiveness or negativeness of the fourth signal, a movement information detector capable of detecting the movement direction of the object 16 to be measured can be constructed.

Although the third signal is outputted from the third signal processing circuit section 20 and the fourth signal is outputted from the fourth signal processing circuit section 25 in FIG. 8A, it is acceptable to provide a device that detects only the movement direction of the object 16 to be measured from the fourth signal or provide a device that detects only the movement velocity of the object 16 to be measured from the third signal or provide a device that can detect the movement velocity and the movement direction by detecting both of them according to the use.

Although the analog signal processing circuit has been mainly described in connection with the third embodiment, it is acceptable to provide the third signal processing circuit section 20 and the fourth signal processing circuit section 25 by a digital signal processing circuit. The first signal and the second signal outputted from the first signal processing circuit section 18 and the second signal processing circuit section 19 are subjected to A/D (analog-to-digital) conversion by first and second circuits not shown and stored as digital data in a storage region of a memory or the like. In the third signal processing circuit section 30, the standardization operation of the signal intensity is carried out by detecting the maximum value, minimum value, Vpp (peak-to-peak) and so on from the data stored in the memory, and subsequently the differential operation is carried out to output the third signal. Moreover, the fourth signal processing circuit section 25 detects the phase of the first signal and the phase of the second signal from the data stored in the memory and detects a phase difference between them. Upon ending the operation processing of the data stored in the memory, the next data are taken in to successively process the information of the movement.

Moreover, FFT (Fast Fourier Transform) can be used as a means for detecting the frequency and the phase by using digitized data in the third signal processing circuit section 20 and the fourth signal processing circuit section 25. Since the low-frequency noises have been removed from the third signal by using FFT, the movement velocity can be obtained from the frequency by peak search of the FFT power spectrum. Moreover, it becomes possible to remove the noise component by comparing the peak of the frequency of the noise caused by the FFT calculation result with the peak intensity of the beat frequency even when the noise removal by the differential operation in the third signal processing circuit section 20 is incomplete. Further, by subjecting the first signal and the second signal to FFT, the phases of the signals can be obtained by the ratio of the real part to the imaginary part of the calculation results, and therefore, the movement direction can be detected. As described above, the movement velocity of the object 16 to be measured can be obtained with high accuracy from the frequency of the third signal, and the movement direction can be concurrently detected from the phase difference between the first signal and the second signal.

The Fourth Embodiment

Figure 9:
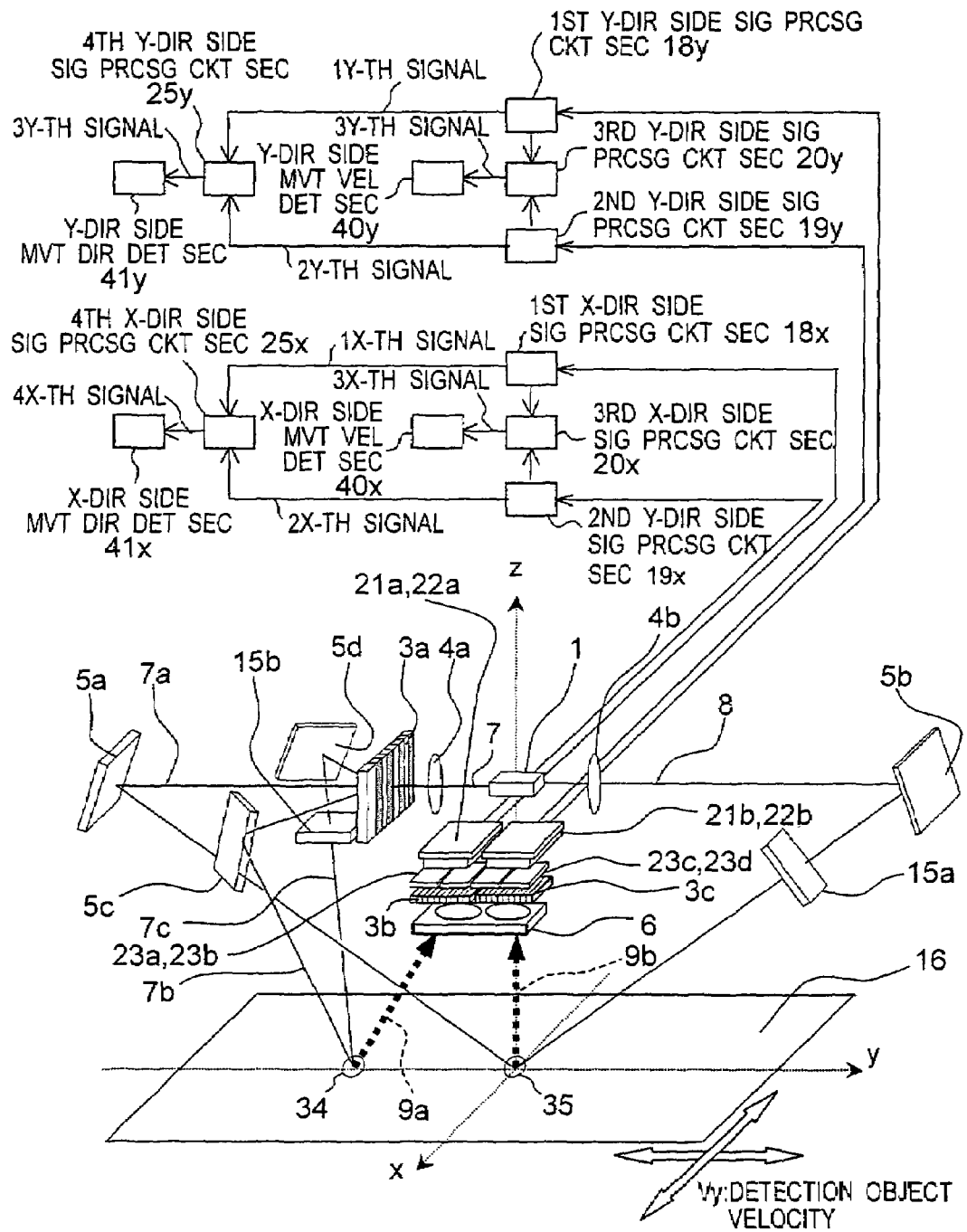
FIG. 9 is a diagram showing the construction of a movement information detection system according to a fourth embodiment of the present invention.

FIG. 9 is a schematic diagram showing the movement information detection system of the fourth embodiment of the present invention. In FIG. 9, the same constituent elements as those of FIGS. 8A and 8B are denoted by same reference numerals, and only parts different from those of FIGS. 8A and 8B will be described in the present embodiment. FIG. 9 shows the arrangement of the optical parts and tracks of rays of light and so on, and no description is provided for other parts that retain the optical parts and so on.

In the construction of FIG. 9, the first light flux 7 and the second light flux 8 are emitted parallel to the y-axis from both end surfaces of the LD 1, and both the light fluxes become parallel light fluxes by CL's 4a and 4b. The first light flux 7 emitted from the front end surface of the LD 1 is split into three light fluxes by the diffraction grating 3a. The zeroth order diffracted light 7a is reflected on the mirror 5a and made incident on a y-detection point 35 so as to be included in the yz plane. On the other hand, the positive and negative first order diffracted lights 7b and 7c are reflected on the mirrors 5c and 5d and made incident on an x-detection point 34 on the y-axis so that the respective incident angles become almost the same. In the meantime, the second light flux 8 emitted from the rear end surface of the LD 1 is reflected on the mirror 5b and made incident on the y-detection point 35 on the x-axis so as to be included in the yz plane. Quarter wavelength plates 15a and 15b are respectively arranged on the optical axes of the second light flux 8 and the positive first order diffracted light 7c.

Similarly to FIGS. 8A and 8B, the beat signal 9a caused by scattered light from the x-detection point 34 is split into two light fluxes by the diffraction grating 3b and received by the first PD 21a and the second PD 22a on the x-direction side via the linear polarizers 23a and 23b. Likewise, the beat signal 9b caused by scattered light from the y-detection point 35 is split into two light fluxes by the diffraction grating 3c and received by the first PD 21b and the second PD 22b on the y-direction side via linear polarizers 23c and 23d.

Then, a 1x-th signal is outputted from a first signal processing circuit section 18x on the x-direction side upon receiving the light reception signal from a first PD 21a on the x-direction side, and a 2x-th signal is outputted from a second signal processing circuit section 19x on the x-direction side upon receiving the light reception signal from a second PD 22a on the x-direction side. Upon receiving the 1x-th signal and the 2x-th signal from the first and second signal processing circuit sections 18x and 19x, a third signal of an interference light signal of which the noise component is removed is outputted from a third signal processing circuit section 20x. A movement velocity detection section 40x detects the frequency of a 3x-th signal from the third signal processing circuit section 20x on the x-direction side and detects the movement velocity of the object to be measured on the basis of the frequency. Moreover, a fourth signal processing circuit section 25x on the x-direction side detects the phases of the inputted 1x-th signal and 2x-th signal, detects a difference between the signals and outputs a 4x-th signal that represents the phase difference. On the basis of the phase difference detected by the fourth signal processing circuit section 25x, the movement direction of the object to be measured is detected by a movement direction detection section 41x.

On the other hand, a 1y-th signal is outputted from a first signal processing circuit section 18y on the y-direction side upon receiving the light reception signal from the first PD 21b on the y-direction side, and a 2y-th signal is outputted from a second signal processing circuit section 19y on the y-direction side upon receiving the light reception signal from the second PD 22b on the y-direction side. Upon receiving the 1y-th signal and the 2y-th signal from the first and second signal processing circuit sections 18y and 19y, a third signal of an interference light signal of which the noise component is removed is outputted from a third signal processing circuit section 20y. A movement velocity detection section 40y detects the frequency of a 3y-th signal from the third signal processing circuit section 20y on the y-direction side and detects the movement velocity of the object to be measured on the basis of the frequency. Moreover, a fourth signal processing circuit section 25y on the y-direction side detects the phases of the inputted 1y-th signal and 2y-th signal, detects a difference between the signals and outputs a 4y-th signal that represents the phase difference. On the basis of the phase difference detected by the fourth signal processing circuit section 25y, the movement direction of the object to be measured is detected by a movement direction detection section 41y.

As described above, in the fourth embodiment, a beat signal 9a relevant to the movement in the x-direction is detected from the x-detection point 34, and a beat signal 9b relevant to the movement in the y-direction is detected from the y-detection point 35. Then, with regard to the beat signal 9a in the x-direction, the movement velocity in the x-direction and the movement direction are detected via the fourth signal processing circuit section 25x from the first signal processing circuit section 18x on the x-direction side as described in connection with the fourth embodiment. With regard to the beat signal 9b, the movement velocity in the y-direction and the movement direction are detected via the fourth signal processing circuit section 25y from the first signal processing circuit section 18y on the y-direction side as described in connection with the fourth embodiment.

Therefore, by the movement information detection system in which the two optical movement information detector structures of the present invention are arranged in the orthogonal directions, the movement of the object to be measured can be detected as two-dimensional information.

Although the construction, in which the x-detection point and the y-detection point are formed by trisecting one side of both the lights emitted from both the end surfaces of the LD 1 shown in FIG. 9, has been described in connection with the fourth embodiment, it is acceptable to form the x-detection point and y-detection point by quadrisecting the light flux of one end surface or to form the detection points by respectively bisecting the light fluxes emitted from both the end surfaces or to arrange two optical systems described with reference to FIGS. 1, 8A and 8B.

The Fifth Embodiment

Figure 10:
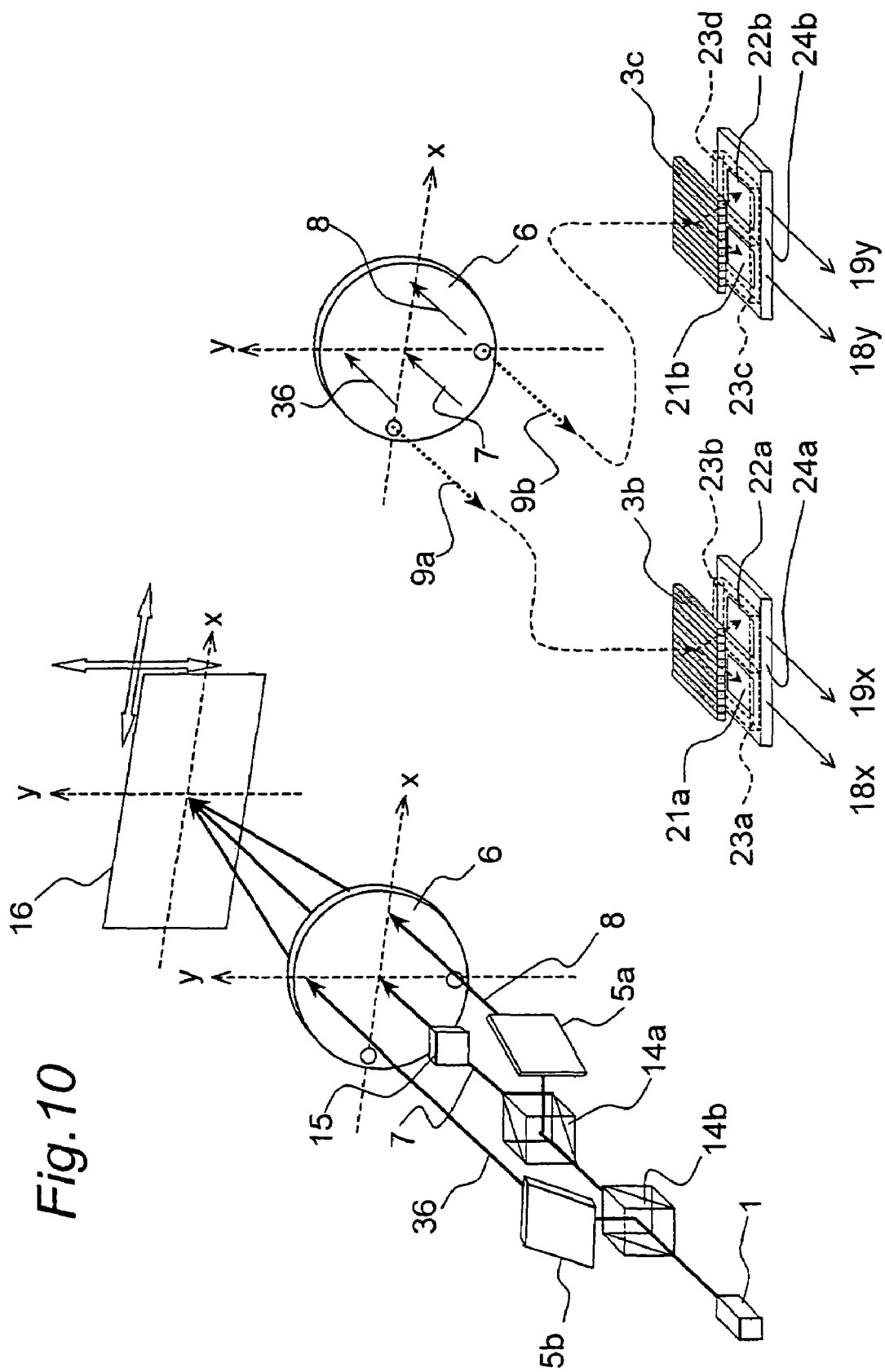
FIG. 10 is a view showing the construction of an optical movement information detector according to a fifth embodiment of the present invention.
Figure 11:
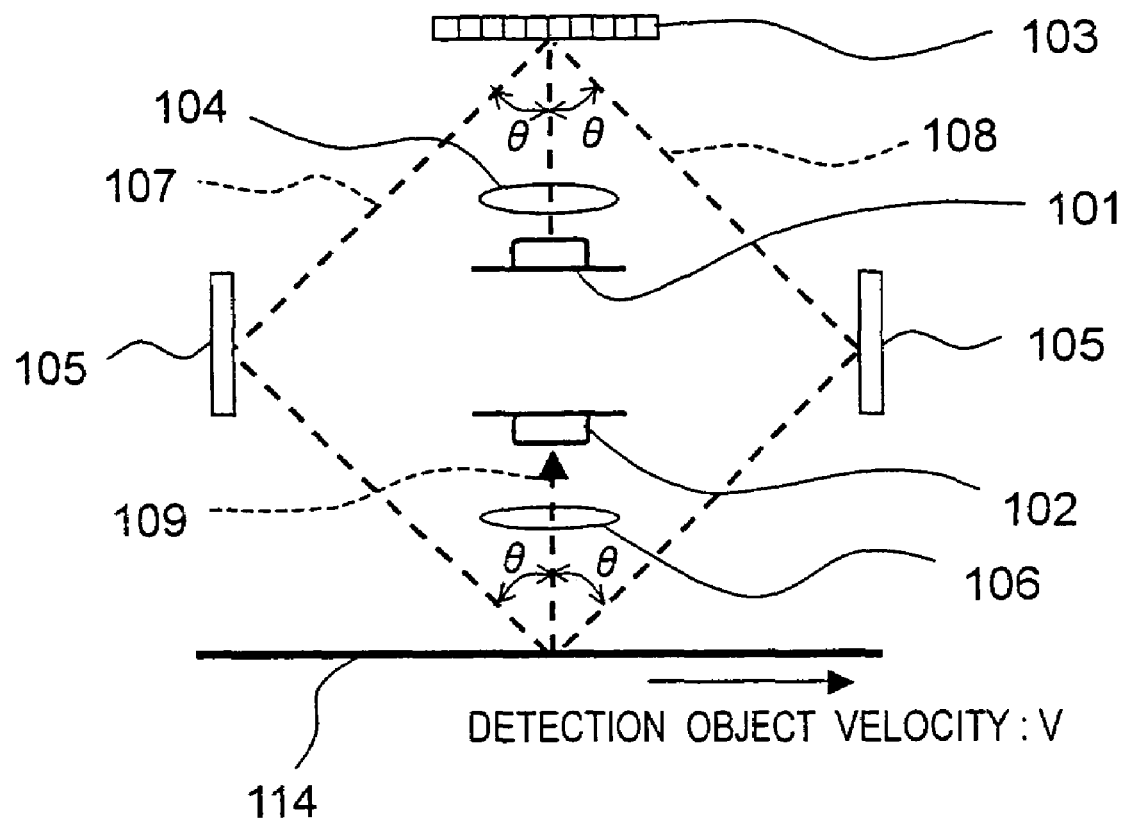
FIG. 11 is a view showing the optical system of a conventional LDV.
Figure 12:
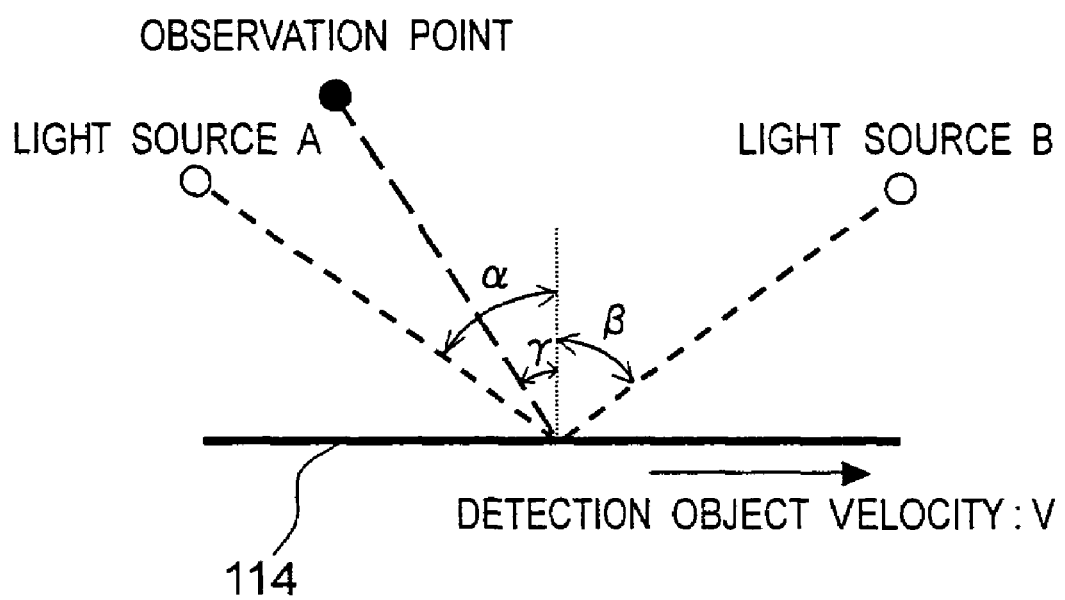
FIG. 12 is a view for explaining an equation that connects the movement velocity of an object to be measured with a Doppler shift frequency.

FIG. 10 is a schematic diagram showing the optical movement information detector of the fifth embodiment. In FIG. 10, the same constituent elements as those of FIG. 9 are denoted by same reference numerals, and only parts different from those of FIG. 9 will be described in the present fifth embodiment. FIG. 10 shows the arrangement of the optical parts and tracks of rays of light and so on, and no description is provided for other parts that retain the optical parts and so on. Moreover, since the construction of the signal processing circuit section is the same as that of FIG. 9, the construction is not shown in FIG. 10.

In the structural example of FIG. 10, the light flux emitted from the LD 1 is formed into a parallel light flux by a CL (not shown) and split into the three of a first light flux 7, a second light flux 8 and a third light flux 36 by BS's 14b and 14a. The second light flux 8 split by the BS 14a is reflected on the mirror 5a and made incident on the OL 6. The third light flux 36 split by the BS 14b is reflected on the mirror 6b and made incident on the OL 6. Moreover, the first light flux 7, which has been transmitted through the BS 14b and the BS 14a, is converted into a circularly polarized light via the quarter wavelength plate 15 and thereafter made incident on the OL 6. In this case, the three light fluxes are all made incident parallel. With regard to the positions where the light fluxes are incident on the OL 6, the first light flux 7 is incident on the center of the OL 6, the second light flux 8 is incident on a point at the x-axis of the OL 6, and the third light flux 36 is incident on a point at the y-axis of the OL 6. A distance between the point on which the second light flux 8 is made incident and the point on which the first light flux 7 is made incident is equal to a distance between the point on which the third light flux 36 is made incident and the point on which the first light flux 7 is made incident. The three light fluxes thus condensed by the OL 6 form one beam spot at the origin of the object 16 to be measured placed at the focal distance. Then, the beat signal 9 scattered from the beam spot on the object 16 to be measured is spherically diffused. A light-receiving system for detecting the movement in the x-direction is provided in a position symmetrical about the origin on the OL 6 with respect to the point at which the second light flux 8 is incident on the OL 6. Moreover, a light-receiving system for detecting the movement in the y-direction is provided in a position symmetrical about the origin on the OL 6 with respect to the point at which the third light flux 36 is incident on the OL 6. No description is provided for the subsequent light reception of the x and y components since it is the same as that of FIGS. 8A and 8B.

Three kinds of beat signals of a frequency shift fdx attributed to the movement in the x-direction, a frequency shift fdy attributed to the movement in the y-direction and a frequency shift (fdx±fdy) of a mixture of them are existing mixed in the beat signal. However, the beat signal 9a for detecting the x-direction component includes the regular reflection light of the second light flux 8, and therefore, the signal intensity attributed to the frequency shift amount fdx out of the three components becomes maximized. Moreover, the beat signal 9b for detecting the y-direction component includes the regular reflection light of the third light flux 36, and therefore, the signal intensity attributed to the frequency shift amount fdy out of the three components becomes maximized. Therefore, if the third signal on the x-direction side of the output of the third signal processing circuit section 20x on the x-direction side is subjected to FFT for the beat signal 9a and the power spectrum is obtained, then the peak intensity of the frequency fdx becomes maximized. Likewise, if the third signal on the y-direction side of the output of the third signal processing circuit section 20y on the y-direction side is subjected to FFT for the beat signal 9b and the power spectrum is obtained, then the peak intensity of the frequency fdy becomes maximized. As described above, the velocities in the x-direction and the y-direction can be obtained from the beam spot at one point.

Further, the first signal of the output of the first signal processing circuit section 18x on the x-direction side and the second signal of the output of the second signal processing circuit section 19x on the x-direction side are subjected to FFT for the beat signal 9a to obtain the phases of the same frequency as the frequency fdx detected by the third signal processing circuit section 20x on the x-direction side for the detection of the first phase and the second phase on the x-direction side. By detecting the phase difference between the first phase and the second phase on the x-direction side, the movement direction in the x-direction can be detected. Moreover, the first phase and the second phase on the y-direction side are similarly subjected to FFT for the beat signal 9b to obtain the phases of the same frequency as the frequency fdy detected by the third signal processing circuit section 20y on the y-direction side for the detection of the first phase and the second phase on the y-direction side. By obtaining the phase difference between the first phase and the second phase on the y-direction side, the movement direction in the y-direction can be detected.

As described above, in the fifth embodiment, the two-dimensional movement velocity and movement direction can be detected by the three-light-flux one-point beam spot, and therefore, the device can be downsized further than in the fourth embodiment, and cost reduction can be achieved with a reduced parts count.

In order to more effectively remove the low-frequency noise component in the first through fifth embodiments and the modification examples described above, the first signal processing circuit section 18 and the second signal processing circuit section 19 are allowed to have a plurality of analog amplifier circuits (not shown) that have a BPF (HPF+LPF) and are connected parallel. In this case, the BPF bands of the amplifier circuit stages are varied, or the bands of the stages are varied, for example, by ten times. That is, a first amplifier circuit section has a band of 1 Hz to 10 Hz, a second amplifier circuit section has a band of 10 Hz to 100 Hz, . . . , and an n-th (n: positive integer) amplifier circuit section has a band of $10^{(n-1)}$ to $10^{(n)}$ Hz. The first signal processing circuit section 18 and the second signal processing circuit section 19 have the same structure. With the structure described above, the detectable velocity range of the object 16 to be measured can be largely extended. More in detail, since the frequency of the low-frequency noise component incessantly changes with the change of the movement velocity of the object 16 to be measured as described hereinabove, the noise frequencies come to be included in the passband of the BPF, and it becomes difficult to completely erase the noises by the third signal processing circuit section 20 due to the arrangement errors of the optical parts and so on. However, since the BPF's of different bands are connected parallel in the present construction, the noise removal becomes more reliable by selecting the optimum outputs of the stages of small low-frequency noises as the outputs of the first signal processing circuit section 18 and the second signal processing circuit section 19 and carrying out the differential operation processing of each of the embodiments in the third signal processing circuit section 20.

Moreover, the movement information detector of each of the embodiments and the modification examples detects the movement velocity of the object 16 to be measured. By taking in the time information during the signal processing in the subsequent stage, the velocity information can easily be converted into the displacement magnitude. For example, in the generally popularized electronic equipment, it can be applied to a displacement gauge for detecting a sheet feed rate in a printer or a copier. In particular, the interference fringe interval of LDV is generally on the micrometer level, and therefore, the resolution of the displacement gauge can be made finer to the micrometer level and further to the submicron level by electrical signal processing. Furthermore, since the LDV can detect the velocity by the reflected light from the moving object, no special processing of scaling or the like is required for the object to be measured. Therefore, the LDV is appropriate for the application to a high-resolution encoder. Moreover, optical mouse devices, which are currently widely popularized, recognize the movement information of a speckle pattern on the detection surface as an image by means of a CCD (Charge Coupled device) or the like and detect the amount of movement. However, this velocimeter can be applied to the optical mouse. As described above, all the velocimeters of the embodiments can be applied to a displacement gauge for detecting a displacement and a vibration meter.

Although the embodiments of the present invention have been described by taking the examples of the optical system one by one, the optical system is not limited to them in all the embodiments, and the shape and so on of the optical system are not limited at all so long as the optical system can produce the effects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical movement information detector comprising:
   a semiconductor light-emitting device which emits coherent light;
   an optical branching device which splits the coherent light emitted from the semiconductor light-emitting device into a first light flux and a second light flux;
   a first optical system which applies at least one of the first and second light fluxes split by the optical branching device to a moving object to be measured;
   a phase changing section which is arranged on an optical axis of either one of the first and second light fluxes of the first optical system and changes a phase of light;
   a second optical system which guides to a first photodetector and a second photodetector, interference light caused by scattered light from the object to be measured when both the first and second light fluxes are applied to the object to be measured or interference light caused by interference of one of the first and second light fluxes with scattered light from the object to be measured when the other of the first and second light fluxes is applied to the object to be measured;
   an interference light splitting section for splitting the interference light caused by the scattered light from the object to be measured of the second optical system into two different phase components having two different phases defined by the phase changing section and making the first and second photodetectors receive the split two different phase components;
   a first signal processing circuit section which receives a light reception signal from the first photodetector and outputs a first signal that represents one phase component of the interference light;
   a second signal processing circuit section which receives a light reception signal from the second photodetector and outputs a second signal that represents the other phase component of the interference light;
   a third signal processing circuit section which outputs a third signal of an interference light signal whose noise component is removed by using the first signal from the first signal processing circuit section and the second signal from the second signal processing circuit section; and
   a movement velocity detection section which detects a frequency of the third signal from the third signal processing circuit section and detects a movement velocity of the object to be measured on the basis of the frequency.

2. The optical movement information detector as claimed in claim 1, wherein
the third signal processing circuit section comprises:
a differential operation section which carries out differential operation of the first signal and the second signal and outputs a result of the operation as a third signal.

3. The optical movement information detector as claimed in claim 2, wherein
the third signal processing circuit section comprises:
a standardization operation section which standardizes the first signal from the first signal processing circuit section and the second signal from the second signal processing circuit section so that signal levels of the first and second signals match with each other, wherein
the differential operation section carries out differential operation of the first signal and the second signal standardized by the standardization operation section.

4. The optical movement information detector as claimed in claim 3, wherein
the standardization operation section standardizes the first signal and the second signal on the basis of at least one of a maximum value on a positive side or a maximum value in terms of an absolute value on a negative side of the amplitudes of the first signal from the first signal processing circuit section and the second signal from the second signal processing circuit section.

5. The optical movement information detector as claimed in claim 3, wherein
the standardization operation section standardizes the first signal and the second signal on the basis of a peak-to-peak value of the amplitudes of the first signal from the first signal processing circuit section and the second signal from the second signal processing circuit section.

6. The optical movement information detector as claimed in claim 1, wherein
the first photodetector and the second photodetector receive the interference light caused by the scattered light from an identical detection point of the object to be measured.

7. The optical movement information detector as claimed in claim 1, comprising:
a fourth signal processing circuit section which detects a phase of the first signal and a phase of the second signal and detects a phase difference between the first signal and the second signal.

8. The optical movement information detector as claimed in claim 7, comprising:
a movement direction detection section which detects a movement direction of the object to be measured on the basis of the phase difference detected by the fourth signal processing circuit section.

9. The optical movement information detector as claimed in claim 1, wherein
the movement velocity detection section includes a frequency counter.

10. The optical movement information detector as claimed in claim 1, wherein
the movement velocity detection section carries out Fast Fourier Transform.

11. The optical movement information detector as claimed in claim 1, wherein
an identical lens is used for the first optical system and the second optical system.

12. The optical movement information detector as claimed in claim 1, wherein
the first and second photodetectors are photodiodes formed on an identical semiconductor substrate.

13. The optical movement information detector as claimed in claim 1, wherein
the first and second photodetectors are segmented photodiodes formed on an identical semiconductor substrate.

14. The optical movement information detector as claimed in claim 1, wherein
the third signal processing circuit section comprises:
an attenuator circuit for adjusting a level of the first signal from the first signal processing circuit section;
a first peak hold circuit which holds a maximum value of amplitude of the first signal whose level is adjusted by an attenuator circuit;
a second peak hold circuit which holds a maximum value of amplitude of the second signal from the second signal processing circuit section;
a first differential operation section which carries out differential operation of a signal from the first peak hold circuit that represents the maximum value of the amplitude of the first signal and a signal from the second peak hold circuit that represents the maximum value of the amplitude of the second signal and inputs a signal that represents the difference to the attenuator circuit; and
a second differential operation section which carries out differential operation of the first signal whose level is adjusted by the attenuator circuit and the second signal from the second signal processing circuit section and outputs a result of the differential operation as the third signal, wherein
the level of the first signal from the first signal processing circuit section is adjusted on the basis of the signal representing the difference from the first differential operation section by the attenuator circuit so that a difference between a signal that represents the maximum value of the amplitude of the first signal from the first peak hold circuit and a signal that represents the maximum value of the amplitude of the second signal from the second peak hold circuit disappears.

15. The optical movement information detector as claimed in claim 14, wherein
the third signal processing circuit section comprises:
a first resistor for setting a level of the first signal inputted to the attenuator circuit; and
a second resistor for setting a level of the second signal inputted to the second peak hold circuit, wherein
resistance values of the second resistor and the first resistor are set so that the level of the first signal inputted to the attenuator circuit becomes greater than the level of the second signal inputted to the second peak hold circuit.

16. The optical movement information detector as claimed in claim 1, wherein
the first photodetector, the second photodetector, and the first, second and third signal processing circuit sections constitute a photodetector with a built-in signal processing circuit section formed on an identical semiconductor substrate.

17. The optical movement information detector as claimed in claim 1, wherein
the first signal processing circuit section and the second signal processing circuit section respectively include analog amplifier circuits that output respectively the first signal and the second signal that are analog signals,
the detector comprises:
a first analog-to-digital converter circuit which converts the first signal from the first signal processing circuit section from an analog form into a digital form and outputs a first digital signal converted in the digital form;

a second analog-to-digital converter circuit that converts the second signal from the second signal processing circuit section from an analog form into a digital form and outputs a second digital signal converted in the digital form; and a memory which stores the first and second digital signals converted by the first and second analog-to-digital converter circuits, wherein a standardization operation section included in the third signal processing circuit section carries out standardization of the first and second digital signals from the first and second analog-to-digital converter circuits on the basis of the first and second digital signals stored in the memory so that signal levels of the first digital signal from the first analog-to-digital converter circuit and the second digital signal from the second analog-to-digital converter circuit match with each other, and a differential operation section included in the third signal processing circuit section carries out differential operation for obtaining a difference between the first digital signal and the second digital signal standardized by the standardization operation section and outputs a result of the operation as a third signal of a digital signal.

18. The optical movement information detector as claimed in claim 17, comprising:

a fourth signal processing circuit section which detects a phase of the first digital signal converted by the first analog-to-digital converter circuit and a phase of the second digital signal converted by the second analog-to-digital converter circuit and calculates a phase difference between the first digital signal and the second digital signal.

19. The optical movement information detector as claimed in claim 1, wherein the first signal processing circuit section has a plurality of amplifier circuit sections that respectively receive a light reception signal from the first photodetector and respectively have band-pass filter characteristics of different bands, the second signal processing circuit section has a plurality of amplifier circuit sections that respectively receive a light reception signal from the second photodetector and respectively have band-pass filter characteristics of different bands, wherein any one of outputs of the plurality of amplifier circuit sections of the first signal processing circuit section is selected, and any one of outputs of the plurality of amplifier circuit sections of the second signal processing circuit section is selected.

20. A movement information detection system, wherein two optical movement information detectors claimed in claim 1 are respectively arranged on coordinate axes of a rectangular coordinate system, and at least a movement velocity is detected in a direction of each coordinate axis of the rectangular coordinates.

21. An optical movement information detector comprising:

a semiconductor light-emitting device which emits coherent light;

an optical branching device which splits the light emitted from the semiconductor light-emitting device into a first light flux, a second light flux and a third light flux;

a phase changing section which is arranged on an optical axis of the first light flux and changes a phase of light;

a first optical system which applies the first light flux whose phase is changed by the phase changing section, the second light flux and the third light flux, to an identical spot on a moving object to be measured;

a second optical system which guides interference light caused by the first and second light fluxes out of scattered light from the object to be measured to a first photodetector group comprised of a (1-1)-th photodetector and a (1-2)-th photodetector;

a first interference light splitting section for splitting the interference light caused by the first and second light fluxes of the second optical system into two different phase components having two different phases defined by the phase changing section and making the (1-1)-th and (1-2)-th photodetectors receive the split two different phase components;

a third optical system which guides the interference light caused by the first and third light fluxes out of the scattered light from the object to be measured to a second photodetector group comprised of a (2-1)-th photodetector and a (2-2)-th photodetector;

a second interference light splitting section for splitting the interference light caused by the first and third light fluxes of the third optical system into two different phase components having two different phases defined by the phase changing section and making the (2-1)-th and (2-2)-th photodetectors receive the split two different phase components;

a (1-1)-th signal processing circuit section which receives a light reception signal from the (1-1)-th photodetector and outputs a (1-1)-th signal that represents one phase component of the interference light caused by the first and second light fluxes;

a (1-2)-th signal processing circuit section which receives a light reception signal from the (1-2)-th photodetector and outputs a (1-2)-th signal that represents the other phase component of the interference light caused by the first and second light fluxes;

a (2-1)-th signal processing circuit section which receives a light reception signal from the (2-1)-th photodetector and outputs a (2-1)-th signal that represents one phase component of the interference light caused by the first and third light fluxes;

a (2-2)-th signal processing circuit section which receives a light reception signal from the (2-2)-th photodetector and outputs a (2-2)-th signal that represents the other phase component of the interference light caused by the first and third light fluxes;

a (3-1)-th signal processing circuit section which outputs a (3-1)-th signal of an interference light signal whose noise component is removed by using the (1-1)-th signal from the (1-1)-th signal processing circuit section and the (2-1)-th signal from the (2-1)-th signal processing circuit section;

a (3-2)-th signal processing circuit section which outputs a (3-2)-th signal of an interference light signal whose noise component is removed by using the (1-2)-th signal from the (1-2)-th signal processing circuit section and the (2-2)-th signal from the (2-2)-th signal processing circuit section; and a movement velocity detection section which detects a frequency of the (3-1)-th signal from the (3-1)-th signal processing circuit section, detects a frequency of the (3-2)-th signal from the (3-2)-th signal processing circuit section and detects a movement velocity of the object to be measured on the basis of the frequencies of the (3-1)-th signal and the (3-2)-th signal.

* * * * *